(12) United States Patent
Kazmi et al.

(10) Patent No.: US 11,202,220 B2
(45) Date of Patent: Dec. 14, 2021

(54) METHOD OF ADAPTING REPORT MAPPING BASED ON BEAMFORMING

(71) Applicant: Telefonaktiebolaget LM Ericsson (publ), Stockholm (SE)

(72) Inventors: Muhammad Kazmi, Sundbyberg (SE); Christopher Callender, Kinross (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/960,981

(22) PCT Filed: Jan. 11, 2019

(86) PCT No.: PCT/IB2019/050239
§ 371 (c)(1),
(2) Date: Jul. 9, 2020

(87) PCT Pub. No.: WO2019/138378
PCT Pub. Date: Jul. 18, 2019

(65) Prior Publication Data
US 2021/0067993 A1    Mar. 4, 2021

Related U.S. Application Data

(60) Provisional application No. 62/617,482, filed on Jan. 15, 2018.

(51) Int. Cl.
*H04W 24/10* (2009.01)
*H04B 17/318* (2015.01)
(Continued)

(52) U.S. Cl.
CPC .......... *H04W 24/10* (2013.01); *H04B 7/0617* (2013.01); *H04B 17/318* (2015.01); *H04W 72/046* (2013.01)

(58) Field of Classification Search
CPC ............................ H04B 17/309; H04W 24/10
See application file for complete search history.

(56) References Cited

U.S. PATENT DOCUMENTS

2018/0020460 A1*  1/2018  Hedayat ................ H04W 52/00

FOREIGN PATENT DOCUMENTS

KR        20160094337 A       8/2016

OTHER PUBLICATIONS

Ericsson, "R4-1712492: Reference point for NR FR2 measurements," 3GPP TSG-RAN WG4 Meeting #85, Reno, USA, Nov. 27-Dec. 1, 2017, 4 pages.

(Continued)

*Primary Examiner* — Kevin Kim
(74) *Attorney, Agent, or Firm* — Withrow & Terranova, PLLC

(57) ABSTRACT

Embodiments of a wireless device, a network node, and methods of operation thereof for adapting a measurement reporting mapping for a measurement being or expected to be performed by the wireless device are disclosed. In some embodiments, a method performed by a wireless device in a wireless communication system comprises obtaining information indicative of whether a measurement being performed or expected to be performed by the wireless device on one or more signals is associated with a beamforming gain and determining a measurement report mapping based on the obtained information. The method further comprises using the determined measurement report mapping to transmit a measurement result to another node. In this manner, the measurement report mapping is adapted based on whether the measurement is associated with a beamforming gain.

29 Claims, 14 Drawing Sheets

(51) Int. Cl.
H04B 7/06 (2006.01)
H04W 72/04 (2009.01)

(56) References Cited

OTHER PUBLICATIONS

Ericsson, "R4-1712494: Analysis of RSRP Report Mapping," 3GPP TSG-RAN WG4 Meeting #85, Reno, USA, Nov. 27-Dec. 1, 2017, 4 pages.
Ericsson, "R4-1713655: Analysis of Report Mapping for NR Signal Quality Measurements," 3GPP TSG RAN WG4 Meeting #85, Reno, USA, Nov. 27-Dec. 1, 2017, 4 pages.
Huawei, "R4-1713940: LS on further clarification on definitions of reference points," 3GPP TSG-RAN WG4 #85 Meeting, Reno, USA, Nov. 27-Dec. 1, 2017, 1 page.
International Search Report and Written Opinion for International Patent Application No. PCT/IB2019/050239, dated Apr. 9, 2019, 17 pages.
Written Opinion for International Patent Application No. PCT/IB2019/050239, dated Nov. 14, 2019, 6 pages.
International Preliminary Report on Patentability for International Patent Application No. PCT/IB2019/050239, dated Mar. 12, 2020, 30 pages.

* cited by examiner

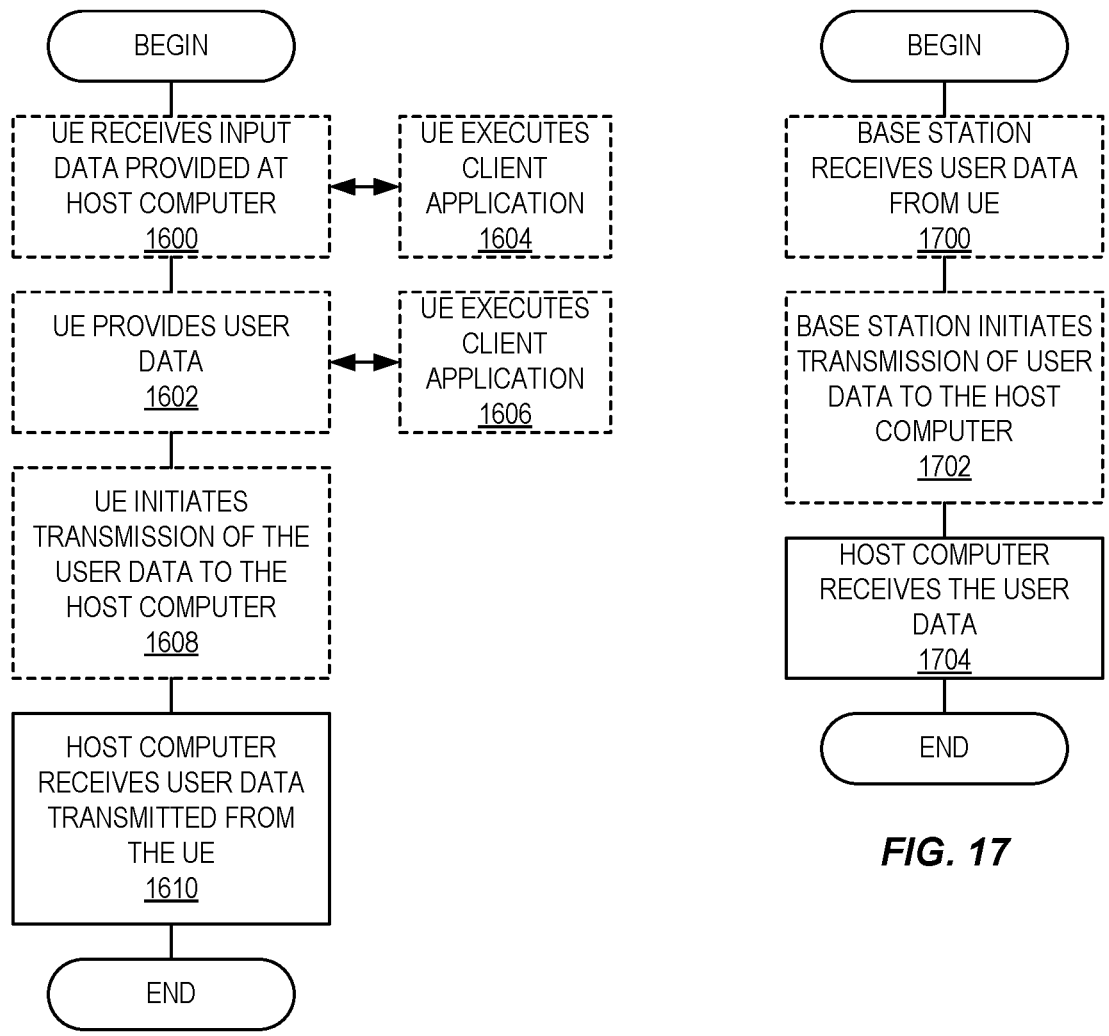

METHOD OF ADAPTING REPORT MAPPING BASED ON BEAMFORMING

RELATED APPLICATIONS

This application is a 35 U.S.C. § 371 national phase filing of International Application No. PCT/162019/050239, filed Jan. 11, 2019, which claims the benefit of provisional patent application Ser. No. 62/617,482, filed Jan. 15, 2018, the disclosures of which are hereby incorporated herein by reference in their entireties.

TECHNICAL FIELD

The present disclosure relates to a cellular communications network and, more specifically, to measurement reporting.

BACKGROUND

In Third Generation Partnership Project (3GPP) New Radio (NR), the User Equipment device (UE) can be configured to perform one or more measurements on one or more carrier frequencies (e.g., intra-frequency carriers, inter-frequency carriers, inter Radio Access Technology (RAT) carriers). The measurements can be done on one or more cells of the configured carrier and/or on the entire carrier (e.g., total interference or received power over the carrier).

A measurement is defined as a Synchronization Signal (SS)/Physical Broadcast Channel (PBCH) Block (SS Block (SSB))-based intra-frequency measurement provided that the center frequency of the SSB of the serving cell indicated for measurement and the center frequency of the SSB of the neighbor cell are the same, and the subcarrier spacing of the two SSBs are also the same. SSB based measurements which do not meet these conditions are inter-frequency measurements. A measurement is defined as a Channel State Information Reference Signal (CSI-RS) based intra-frequency measurement provided that the bandwidth of the CSI-RS resource on the neighbor cell configured for measurement is within the bandwidth of the CSI-RS resource on the serving cell configured for measurement, and the subcarrier spacing of the two CSI-RS resources are the same. CSI-RS based measurements that do not meet these conditions are inter-frequency measurements.

The measurements on the inter-frequency and inter-RAT frequency layers are typically performed by the UE using measurement gaps. However, the UE may also perform measurements on inter-frequency and inter-RAT frequency layers without measurement gaps, e.g. if the UE has such capability. The UE may also need measurement gaps for performing the intra-frequency measurements, e.g. when the UE configured bandwidth is less than the cell bandwidth, when the UE needs to apply receiver beamforming, etc.

The measurements can be performed on any suitable signals configured by the network node, e.g. on signals transmitted by SS/PBCH blocks (SSB), CSI-RS resources, discovery signals, positioning reference signals, etc. Generic examples of measurements are signal strength, signal quality, etc. A SSB in NR transmits Primary Synchronization Signal (PSS), Secondary Synchronization Signal (SSS), and PBCH, where PBCH symbols also contain Demodulation Reference Signal (DMRS). Reference Signal Received Power (RSRP), Reference Signal Received Quality (RSRQ), and Signal to Interference plus Noise Ratio (SINR) measured on reference signals in SSB are also called as SS-RSRP, SS-RSRQ, and SS-SINR respectively. RSRP, RSRQ, and SINR measured on CSI-RS are also called CSI-RSRP, CSI-RSRQ, and CSI-SINR respectively. For simplicity, generic terms like RSRP, RSRQ, and SINR are used. RSRP and path loss are specific examples of a signal strength measurement. RSRP, SINR, and RSRQ are specific examples of a signal quality measurement. Other examples of measurements are timing related measurements, e.g. Round Trip Time (RTT), System Frame Number (SFN) Frame Time Difference (SFTD), SFN Subframe Time Difference (SSTD), etc.

After performing the measurement, the UE reports the results of the measurements to the network node, e.g. in Radio Resource Control (RRC) connected state. For example, in NR, the UE can report any of the 128 possible measurement values by using a 7-bit field.

Both transmit and receive beamforming are important technologies for NR, especially when operating on millimeter wave (mmW), called Frequency Range 2 (FR2), where beamforming can compensate for the increased path loss that occurs at higher frequencies.

In the present disclosure, receive beamforming, which is performed at the UE prior to making measurements, is discussed. Beamforming makes use of multiple antenna elements such that the antenna has a directional response. FIG. 1 shows an example of antenna arrangement in the UE with four groups of mmW antennas each consisting of four elements.

FIG. 2 shows a downlink architecture assuming analogue beamforming. By suitably configuring the analogue phase shifters shown in FIG. 2 prior to combining, a controllable directional response can be obtained from the antenna system. For example, for a rectangular M×N antenna array such as that illustrated in the example antenna model of FIG. 3, the peak antenna response may be electrically steered away from the boresight direction of the antenna in both the horizontal and vertical axes.

For measurements, typically, the UE does not have prior knowledge (e.g., before detecting a cell) of the direction in which the measured cell is being transmitted from, relative to its own antenna orientation. Therefore, the UE may search through a predefined and finite set of phase shifts, also known as a codebook. The codebook entry which gives the largest RSRP for a given cell can be assumed to be the optimum codebook entry for measuring that particular cell, and further measurement samples may be performed using the same codebook setting.

Beamforming may also be performed in the digital domain. For full digital beamforming, a signal from each antenna element would be fed to an Analog-to-Digital Converter (ADC), and the phase shifting to perform beamforming would be applied in digital processing rather than an analog implementation prior to the ADC. This allows greater flexibility—different symbols transmitted at the same time can have different beamforming applied. However, the complexity of digital beamforming is greater due to the needed ADCs, etc. Hybrid beamforming is also possible.

Since a beamformed antenna system has an electrically adjustable directional response, there are directions in which it has gain when compared with an isotropic antenna and other directions in which it has loss when compared with an isotropic antenna. The gain or loss is typically expressed as a decibel (dB) value compared to the response of an isotropic antenna in units of dBi, with a positive value representing a gain and a negative value representing a loss. When performing measurements, the UE will typically attempt to use a codebook entry for the weight (or for analog beamforming, phase shifter) setting which gives the best gain in the direction being measured (out of the set of possible codebook entries). The process of attempting to measure with different receive directions using codebook entries to find which one gives the best result is also referred to as (receive) beam sweeping.

In 3GPP, it has been decided that the reported measurement value (such as SS-RSRP) should include beamforming gain, i.e., the UE should not attempt to estimate the beamforming gain which currently applies to the measurement and compensate for it. A liaison statement in R4-1713940 provides further details of the method for performing measurements when there is no antenna connector, and specifically for FR2, measurements should be performed on the combined signal (where antenna gain will be applicable).

For FR1, the definition of the measurement reference point for RSRP, RSRQ, SINR and any other UE measurements shall be the antenna connector.

For FR2, RAN4 concludes that there is no physical reference point for UE measurement. Thus RAN4 recommends a functional description of how measurements are performed by the UE rather than defining a physical reference point. The recommend description is shown below:

For FR2, RSRP, RSRQ, SINR and any other UE measurements shall be measured based on the combined signal from antenna elements corresponding to a given receiver branch. If receiver diversity is in use by the UE, the reported measurement value shall not be lower than the corresponding value of any of the individual receiver branches.

For FR2, RAN4 concludes that there is no physical reference point for UE measurement. Thus RAN4 recommends a functional description of how measurements are performed by the UE rather than defining a physical reference point. The recommend description is shown below:

For FR2, RSRP, RSRQ, SINR and any other UE measurements shall be measured based on the combined signal from antenna elements corresponding to a given receiver branch. If receiver diversity is in use by the UE, the reported measurement value shall not be lower than the corresponding value of any of the individual receiver branches.

Since the objective of beam sweeping is to find the optimal codebook entry for making the measurement, it follows that the reported measurement result should be larger than the result which would have been obtained without beamforming or with an isotropic antenna (i.e., the chosen codebook entry should result in a positive dBi gain).

The use of receive beamforming when making measurements results in new challenges that need to addressed.

SUMMARY

Embodiments of a wireless device, a network node, and methods of operation thereof for adapting a measurement reporting mapping for a measurement being or expected to be performed by the wireless device are disclosed. In some embodiments, a method performed by a wireless device in a wireless communication system comprises obtaining information indicative of whether a measurement being performed or expected to be performed by the wireless device on one or more signals is associated with a beamforming gain and determining a measurement report mapping based on the obtained information. The method further comprises using the determined measurement report mapping to transmit a measurement result to another node. In this manner, the measurement report mapping is adapted based on whether the measurement is associated with a beamforming gain.

In some embodiments, obtaining the information indicative of whether the measurement being performed or expected to be performed by the wireless device on one or more signals is associated with a beamforming gain comprises obtaining information that indicates whether the wireless device is applying or is expected to apply beamforming when performing the measurement and, if the wireless device is applying or is expected to apply beamforming when performing the measurement, determining whether the measurement is or is expected to be associated with any beamforming gain. Further, in some embodiments, determining whether the measurement is or is expected to be associated with any beamforming gain comprises determining whether the measurement is or is expected to be associated with any beamforming gain based on one or more criteria comprising a criteria related to a frequency range of one or more signals used or to be used for the measurement, a criteria related to a type of signal(s) used or to be used for the measurement, a criteria related to a capability of the wireless device to use beamforming for the measurement, a criteria related to power consumption and processing at the wireless device, and/or a criteria related to a configuration message received from another node.

In some embodiments, determining the measurement report mapping based on the obtained information comprises determining the measurement report mapping as a first measurement report mapping if the measurement is associated with a beamforming gain and determining the measurement report mapping as a second measurement report mapping if the measurement is not associated with a beamforming gain, the second measurement report mapping being different than the first measurement report mapping. Further, in some embodiments, the first measurement report mapping and the second measurement report mapping are for a same measurement quantity and differ with respect to a maximum reportable value in the first measurement report mapping is greater than a maximum reportable value in the second measurement report mapping, a minimum reportable value in the first measurement report mapping is greater than a minimum reportable value in the second measurement report mapping, and/or a resolution of reportable values in the first measurement report mapping is different than a resolution of reportable values in the second measurement report mapping.

In some embodiments, the determined measurement report mapping is one of two or more measurement report mappings comprising at least the first measurement report mapping and the second measurement report mapping. The two or more measurement report mappings are for a same measurement quantity and differ with respect to a maximum reportable value, a minimum reportable value, and/or a resolution of reportable values.

In some embodiments, the determined measurement report mapping comprises a range of two or more reportable values for transmitting a result of the measurement to another node. Further, determining the measurement report mapping comprises selecting the measurement report mapping from a set of at least two measurement report mappings for a same measurement quantity that differ with respect to a maximum reportable value in the range of two or more reportable values, a minimum reportable value in the range of two or more reportable values, and/or a resolution of reportable values in the range of two or more reportable values.

In some embodiments, the method further comprises transmitting an indication of the determined measurement report mapping to the other node.

In some embodiments, the measurement is a signal quality measurement or a signal strength measurement.

Embodiments of a wireless device are also disclosed. In some embodiments, a wireless device for a wireless communication system is adapted to obtain information indicative of whether a measurement being performed or expected to be performed by the wireless device on one or more signals is associated with a beamforming gain and determine a measurement report mapping based on the obtained information. The wireless device is further adapted to use the determined measurement report mapping to transmit a measurement result to another node.

In some other embodiments, a wireless device for a wireless communication system comprises one or more transmitters, one or more receivers, and processing circuitry associated with the one or more transmitters and the one or more receivers. The processing circuitry is configured to cause the wireless device to obtain information indicative of whether a measurement being performed or expected to be performed by the wireless device on one or more signals is associated with a beamforming gain and determine a measurement report mapping based on the obtained information. The processing circuitry is further configured to cause the wireless device to use the determined measurement report mapping to transmit a measurement result to another node.

In some embodiments, in order to obtain the information indicative of whether the measurement being performed or expected to be performed by the wireless device on one or more signals is associated with a beamforming gain, the processing circuitry is further configured to cause the wireless device to obtain information that indicates whether the wireless device is applying or is expected to apply beamforming when performing the measurement and, if the wireless device is applying or is expected to apply beamforming when performing the measurement, determine whether the measurement is or is expected to be associated with any beamforming gain. Further, in some embodiments, the wireless device determines whether the measurement is or is expected to be associated with any beamforming gain based on one or more criteria comprising a criteria related to a frequency range of one or more signals used or to be used for the measurement, a criteria related to a type of signal(s) used or to be used for the measurement, a criteria related to a capability of the wireless device to use beamforming for the measurement, a criteria related to power consumption and processing at the wireless device, and/or a criteria related to a configuration message received from another node.

In some embodiments, the determined measurement report mapping comprises a range of two or more reportable values for transmitting a result of the measurement to another node. Further, in order to determine the measurement report mapping, the processing circuitry is further configured to cause the wireless device to select the measurement report mapping from a set of at least two measurement report mappings for a same measurement quantity that differ with respect to a maximum reportable value in the range of two or more reportable values, a minimum reportable value in the range of two or more reportable values, and/or a resolution of reportable values in the range of two or more reportable values.

In some embodiments, the processing circuitry is further configured to cause the wireless device to transmit an indication of the determined measurement report mapping to the other node.

In some embodiments, the measurement is a signal quality measurement or a signal strength measurement.

In some other embodiments, a method performed by a wireless device in a wireless communication system comprises receiving, from a network node, an indication of a configured measurement report mapping to be used by the wireless device for reporting a result of a measurement that is being performed or expected to be performed by the wireless device on one or more signals and is associated with a beamforming gain. The method further comprises using the configured measurement report mapping to transmit a measurement result to another node.

In some embodiments, the configured measurement report mapping comprises a range of two or more reportable values for transmitting a result of the measurement to another node, and the configured measurement report mapping is one of a set of at least two measurement report mappings for a same measurement quantity that differ with respect to a maximum reportable value in the range of two or more reportable values, a minimum reportable value in the range of two or more reportable values, and/or a resolution of reportable values in the range of two or more reportable values.

In some other embodiments, a wireless device for a wireless communication system is adapted to receive, from a network node, an indication of a configured measurement report mapping to be used by the wireless device for reporting a result of a measurement that is being performed or expected to be performed by the wireless device on one or more signals and is associated with a beamforming gain, and use the configured measurement report mapping to transmit a measurement result to another node.

In some embodiments, the configured measurement report mapping comprises a range of two or more reportable values for transmitting a result of the measurement to another node, and the configured measurement report mapping is one of a set of at least two measurement report mappings for a same measurement quantity that differ with respect to a maximum reportable value in the range of two or more reportable values, a minimum reportable value in the range of two or more reportable values, and/or a resolution of reportable values in the range of two or more reportable values.

In some embodiments, a wireless device for a wireless communication system comprises one or more transmitters, one or more receivers, and processing circuitry associated with the one or more transmitters and the one or more receivers. The processing circuitry is configured to cause the wireless device to receive, from a network node, an indication of a configured measurement report mapping to be used by the wireless device for reporting a result of a measurement that is being performed or expected to be performed by the wireless device on one or more signals and is associated with a beamforming gain, and use the configured measurement report mapping to transmit a measurement result to another node.

In some embodiments, the configured measurement report mapping comprises a range of two or more reportable values for transmitting a result of the measurement to another node, and the configured measurement report mapping is one of a set of at least two measurement report mappings for a same measurement quantity that differ with respect to a maximum reportable value in the range of two or more reportable values, a minimum reportable value in the range of two or more reportable values, and/or a resolution of reportable values in the range of two or more reportable values.

Embodiments of a method performed by a network node are also disclosed. In some embodiments, a method performed by a network node in a wireless communication system comprises obtaining information indicative of whether a measurement being performed or expected to be performed by a wireless device on one or more signals is associated with a beamforming gain and determining a measurement report mapping based on the obtained information. The method further comprises using the determined measurement report mapping for one or more operational tasks.

In some embodiments, the one or more operational tasks comprise receiving and interpreting measurement results from the wireless device, configuring the wireless device with the measurement report mapping, configuring the wireless device with suitable thresholds for reporting measurement events, and/or using measurement results received from the wireless device for executing one or more procedures.

In some embodiments, obtaining the information indicative of whether the measurement being performed or expected to be performed by the wireless device on one or more signals is associated with a beamforming gain comprises obtaining information that indicates whether the wireless device is applying or is expected to apply beamforming when performing the measurement and, if the wireless device is applying or is expected to apply beamforming when performing the measurement, determining whether the measurement is or is expected to be associated with any beamforming gain. Further, in some embodiments, determining whether the measurement is or is expected to be associated with any beamforming gain comprises determining whether the measurement is or is expected to be associated with any beamforming gain based on one or more criteria comprising a criteria related to a frequency range of one or more signals used or to be used for the measurement, a criteria related to a type of signal(s) used or to be used for the measurement, a criteria related to a capability of the wireless device to use beamforming for the measurement, a criteria related to power consumption and processing at the wireless device, and/or a criteria related to a configuration message received from another node.

In some embodiments, determining the measurement report mapping based on the obtained information comprises determining the measurement report mapping as a first measurement report mapping if the measurement is associated with a beamforming gain and determining the measurement report mapping as a second measurement report mapping if the measurement is not associated with a beamforming gain, the second measurement report mapping being different than the first measurement report mapping. Further, in some embodiments, the first measurement report mapping and the second measurement report mapping are for a same measurement quantity and differ with respect to a maximum reportable value in the first measurement report mapping is greater than a maximum reportable value in the second measurement report mapping, a minimum reportable value in the first measurement report mapping is greater than a minimum reportable value in the second measurement report mapping, and/or a resolution of reportable values in the first measurement report mapping is different than a resolution of reportable values in the second measurement report mapping.

In some embodiments, the determined measurement report mapping is one of two or more measurement report mappings comprising at least the first measurement report mapping and the second measurement report mapping. The two or more measurement report mappings are for a same measurement quantity and differ with respect to maximum reportable value, a minimum reportable value, and/or a resolution of reportable values.

In some embodiments, the configured measurement report mapping comprises a range of two or more reportable values for transmitting a result of the measurement to another node, and the configured measurement report mapping is one of a set of at least two measurement report mappings for a same measurement quantity that differ with respect to a maximum reportable value in the range of two or more reportable values, a minimum reportable value in the range of two or more reportable values, and/or a resolution of reportable values in the range of two or more reportable values.

In some embodiments, the measurement is a signal quality measurement or a signal strength measurement.

In some embodiments, the method further comprises configuring the wireless device to perform one or more radio measurements comprising the measurement, and configuring the wireless device to report measurement results for the one or more radio measurements.

In some embodiments, the one or more operational tasks comprise configuring the wireless device with the determined measurement report mapping for the measurement.

Embodiments of a network node are also disclosed. In some embodiments, a network node for a wireless communication system is adapted to obtain information indicative of whether a measurement being performed or expected to be performed by a wireless device on one or more signals is associated with a beamforming gain and determine a measurement report mapping based on the obtained information. The network node is further adapted to use the determined measurement report mapping for one or more operational tasks.

In some embodiments, a network node for a wireless communication system comprises a network interface or one or more radio units, and processing circuitry associated with the network interface or the one or more radio units. The processing circuitry is configured to cause the network node to obtain information indicative of whether a measurement being performed or expected to be performed by a wireless device on one or more signals is associated with a beamforming gain and determine a measurement report mapping based on the obtained information. The processing circuitry is further configured to cause the network node to use the determined measurement report mapping for one or more operational tasks.

In some embodiments, the one or more operational tasks comprise receiving and interpreting measurement results from the wireless device, configuring the wireless device with the measurement report mapping, configuring the wireless device with suitable thresholds for reporting measurement events, and/or using measurement results received from the wireless device for executing one or more procedures.

In some embodiments, in order to obtain the information indicative of whether the measurement being performed or expected to be performed by the wireless device on one or more signals is associated with a beamforming gain, the processing circuitry is further configured to cause the network node to obtain information that indicates whether the wireless device is applying or is expected to apply beamforming when performing the measurement and, if the wireless device is applying or is expected to apply beamforming when performing the measurement, determine whether the measurement is or is expected to be associated with any beamforming gain. Further, in some embodiments, the network node determines whether the measurement is or is expected to be associated with any beamforming gain based on one or more criteria comprising a criteria related to a frequency range of one or more signals used or to be used for the measurement, a criteria related to a type of signal(s) used or to be used for the measurement, a criteria related to a capability of the wireless device to use beamforming for the measurement, a criteria related to power consumption and processing at the wireless device, and/or a criteria related to a configuration message received from another node.

In some embodiments, the configured measurement report mapping comprises a range of two or more reportable values for transmitting a result of the measurement to another node, and the configured measurement report mapping is one of a set of at least two measurement report mappings for a same measurement quantity that differ with respect to a maximum reportable value in the range of two or more reportable values, a minimum reportable value in the range of two or more reportable values, and/or a resolution of reportable values in the range of two or more reportable values.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 16 is a flowchart illustrating a method implemented in a communication system in accordance with one embodiment on the present disclosure; and FIG. 17 is a flowchart illustrating a method implemented in a communication system in accordance with one embodiment of the present disclosure.

DETAILED DESCRIPTION

Figure 1:
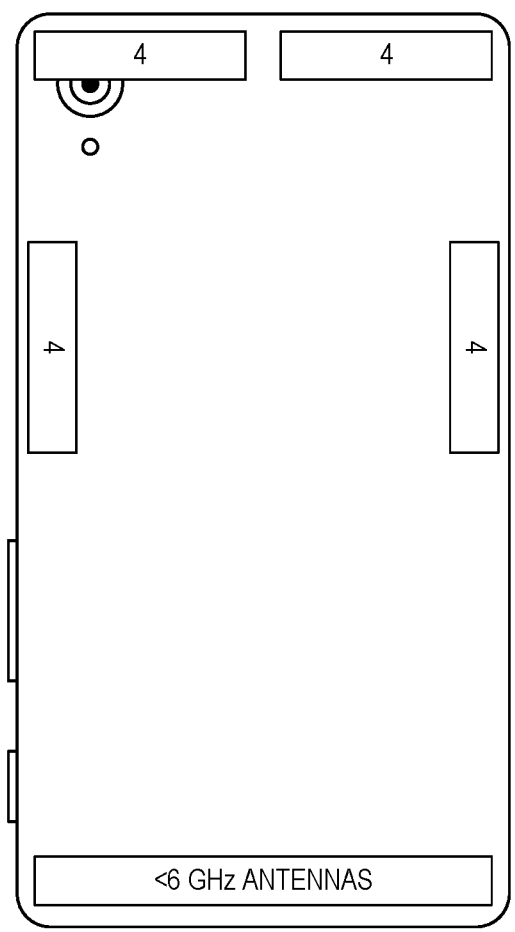
FIG. 1 shows an example of antenna arrangement in the User Equipment device (UE) with four groups of millimeter wave (mmW) antennas each consisting of four elements.
Figure 2:
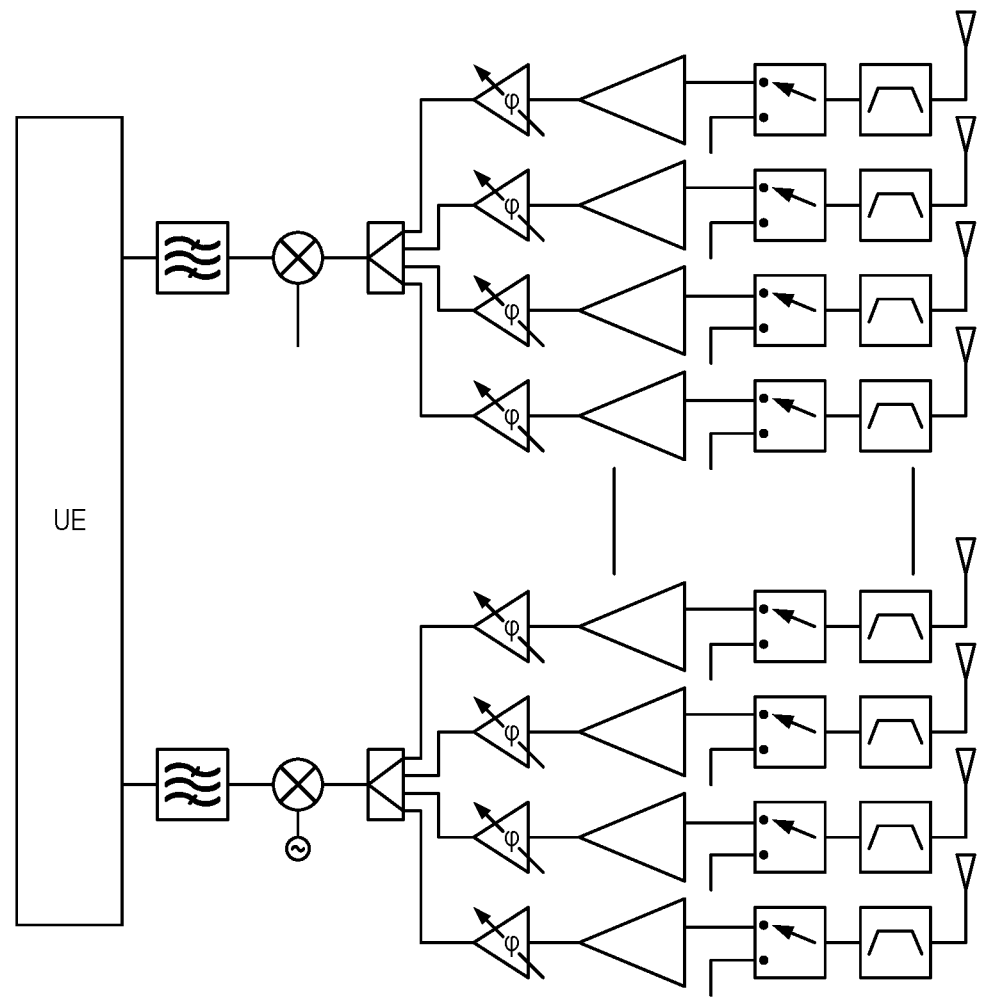
FIG. 2 shows a downlink architecture assuming analogue beamforming.
Figure 3:
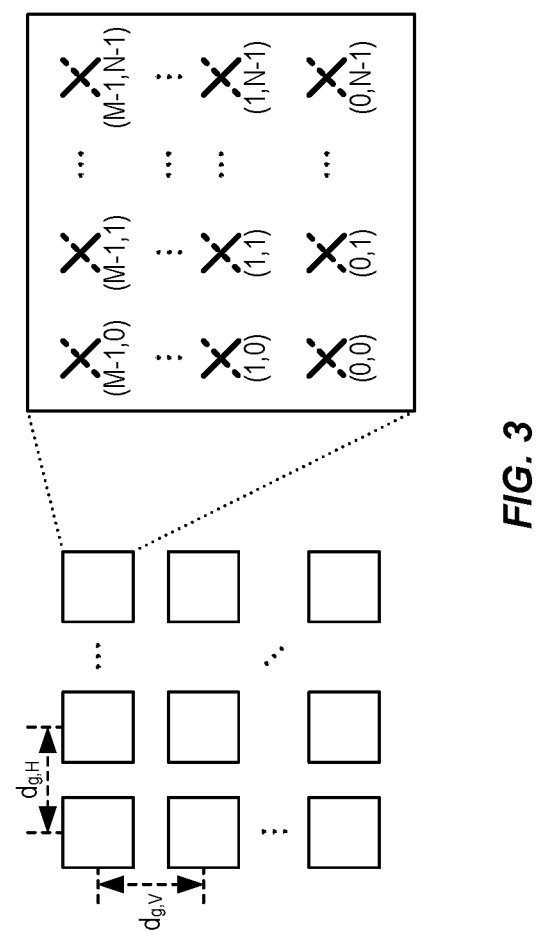
FIG. 3 illustrates an example antenna model.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art In some embodiments a non-limiting term "User Equipment device (UE)" is used. The UE herein can be any type of wireless device capable of communicating with network node or another UE over radio signals. The UE may also be a radio communication device, a target device, a Device-to-Device (D2D) UE, a machine type UE or a UE capable of Machine-to-Machine (M2M) communication, a sensor equipped with a UE, a tablet, mobile terminals, a smart phone, Laptop Embedded Equipment (LEE), Laptop Mounted Equipment (LME), Universal Serial Bus (USB) dongles, Customer Premise Equipment (CPE), etc.

Also in some embodiments generic terminology "network node" is used. It can be any kind of network node which may comprise a radio network node such as a base station, a radio base station, a base transceiver station, a base station controller, a network controller, a New Radio (NR) base station (gNB), an enhanced or evolved Node B (eNB), a Node B, a Multi-Cell/Multicast Coordination Entity (MCE), a relay node, an Access Point (AP), a radio access point, a Remote Radio Unit (RRU) Remote Radio Head (RRH), a multi-standard base station (a.k.a. a Multi-Standard Radio (MSR) base station), a core network node (e.g., a Mobility Management Entity (MME), a Self-Organizing Network (SON) node, a coordinating node, a positioning node, a Minimization of Drive Tests (MDT) node, etc.), etc. The network node may also comprise test equipment.

The term "radio node" or simply node used herein may be used to denote a UE or a network node.

The embodiments are applicable to single carrier as well as to multicarrier or Carrier Aggregation (CA) operation of the UE in which the UE is able to receive and/or transmit data to more than one serving cells. The term CA is also called (e.g., interchangeably called) "multi-carrier system," "multi-cell operation," "multi-carrier operation," "multi-carrier" transmission, and/or reception. In CA one of the Component Carriers (CCs) is the Primary CC (PCC) or simply primary carrier or even anchor carrier. The remaining CCs are called Secondary CCs (SCCs) or simply secondary carriers or even supplementary carriers. The serving cell is interchangeably called a Primary Cell (PCell) or Primary Serving Cell (PSC). Similarly, the secondary serving cell is interchangeably called a Secondary Cell (SCell) or Secondary Serving Cell (SSC).

The term "signaling" used herein may comprise any of: high-layer signaling (e.g., via Radio Resource Control (RRC) or the like), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term "radio measurement" used herein may refer to any measurement performed on radio signals. Radio measurements can be absolute or relative. A radio measurement may be called signal level, which may be signal quality and/or signal strength. Radio measurements can be, e.g., intra-frequency, inter-frequency, CA, etc. The measurement can be performed on one or more cells operating on a frequency layer (e.g., cell specific measurement and/or on a carrier frequency (e.g., carrier specific measurement) which may be common for more than one cells on that carrier. Radio measurements can be unidirectional (e.g., downlink or uplink) or bidirectional (e.g., Round Trip Time (RTT), Rx-Tx, etc.). Some examples of radio measurements include: timing measurements (e.g., Time of Arrival (TOA), timing advance, RTT, Reference Signal Time Difference (RSTD), Rx-Tx, propagation delay, System Frame Number (SFN) Subframe Time Difference (SSTD), SFN Frame Time Difference (SFTD), etc.), angle measurements (e.g., angle of arrival), power-based measurements (e.g., received signal power, Reference Signal Received Power (RSRP), received signal quality, Reference Signal Received Quality (RSRQ), Signal to Interference plus Noise Ratio (SINR), Signal to Noise Ratio (SNR), interference power, total interference plus noise, Received Signal Strength Indicator (RSSI), noise power, etc.), cell detection or cell identification, Radio Link Monitoring (RLM), System Information (SI) reading, etc.

The term "measurement performance" used herein may refer to any criteria or metric which characterizes the performance of the measurement performed by a radio node. The term measurement performance is also called measurement requirement, measurement performance requirements, etc. The radio node has to meet one or more measurement performance criteria related to the performed measurement. Examples of measurement performance criteria are measurement time, number of cells to be measured with the measurement time, measurement reporting delay, measurement accuracy, measurement accuracy with regard to a reference value (e.g., ideal measurement result), etc.

Examples of measurement time are measurement period, cell identification period, evaluation period, etc.

The term "Measurement Report Mapping" (MRM) comprises a range of two or more potential or possible values for transmitting a result of a measurement performed by the UE to another node. The MRM is typically predefined but it can also be configured at the UE by another node, e.g. network node. The MRM comprises one or more report mapping specific parameters. Examples of such parameters are resolution of reportable values (e.g., granularity), two or more reportable values, minimum reportable value and maximum reportable value, etc. Each reportable value is associated with a measurement quantity (e.g., RSRP) or a range of a measurement quality (e.g., between RSRP of X1 decibel-milliwatt (dBm) and RSRP of X2 dBm). The MRM is also interchangeably called reporting range, measurement reporting range, value range, etc.

In Third Generation Partnership Project (3GPP) NR, the UE will typically have a larger number of receive antenna elements in each of its antenna ports especially at higher frequency, e.g. above 6 gigahertz (GHz). This enables the UE to also use beamforming when performing a measurement. The beamforming leads to beamforming gain in the measurement results, which enhances the UE measurement performance and also affects the results of the measurements reported by the UE to the network node. This will also impact the interpretation of these results by the network node when using them for certain tasks, e.g. mobility decision. However, the existing measurement reporting procedure does not address these new aspects of the NR measurements, especially as the range of the measured value will be different (larger) due to the beamforming gain.

Certain aspects of the present disclosure and their embodiments may provide solutions to the aforementioned or other challenges. The present disclosure involves methods in a UE and a network node and comprises several embodiments.

According to a first embodiment, a UE obtains information about whether a measurement (e.g., RSRP, RSRQ, etc.) that is being performed by the UE or is expected to be performed by the UE is associated with a beamforming gain or not and determines a MRM based on whether the measurement is associated with a beamforming gain or not. The UE further uses the determined MRM for reporting the results of the performed measurement to a node (e.g., a network node, another UE, etc.). As an example, two or more MRMs (e.g., MRM1 with beamforming gain and MRM2 without beamforming gain) can be predefined. The UE can select (e.g., based on a criteria such as frequency range, symbols used for measurements, indication from the network node, etc.) one of the predefined MRMs and use it for transmitting the measurement results to another node.

According to a second embodiment, a network node obtains information about whether a measurement (e.g., RSRP, RSRQ, etc.) that is being performed by the UE or is expected to be performed by a UE is associated with a beamforming gain or not and determines a MRM based on whether the measurement is associated with a beamforming gain or not. The network node further uses the determined MRM for performing one or more radio operational tasks. Examples of such tasks are configuring the UE with the determined MRM for enabling the UE to report the results of the performed measurement to a node (e.g., the network node, another UE, etc.), using the determined MRM for interpreting the results of the measurements received from the UE, adapting measurement configuration, etc.

There are, proposed herein, various embodiments which address one or more of the issues disclosed herein. Certain embodiments may provide one or more of the following technical advantage(s). For example, using embodiments of the present disclosure, the UE behavior with regard to the measurement reporting is well defined. This enables the network to accurately interpret the UE reported measurement results and whether the beamforming gain is included in the measurement or not. As another example, the performance of procedures (e.g., cell change such as Handover (HO), positioning, etc.) relying on UE measurements is enhanced. As another example, the method allows flexibility in the UE and network implementation in terms of measurement procedure especially in the millimeter wave (mmW) scenario.

Figure 4:
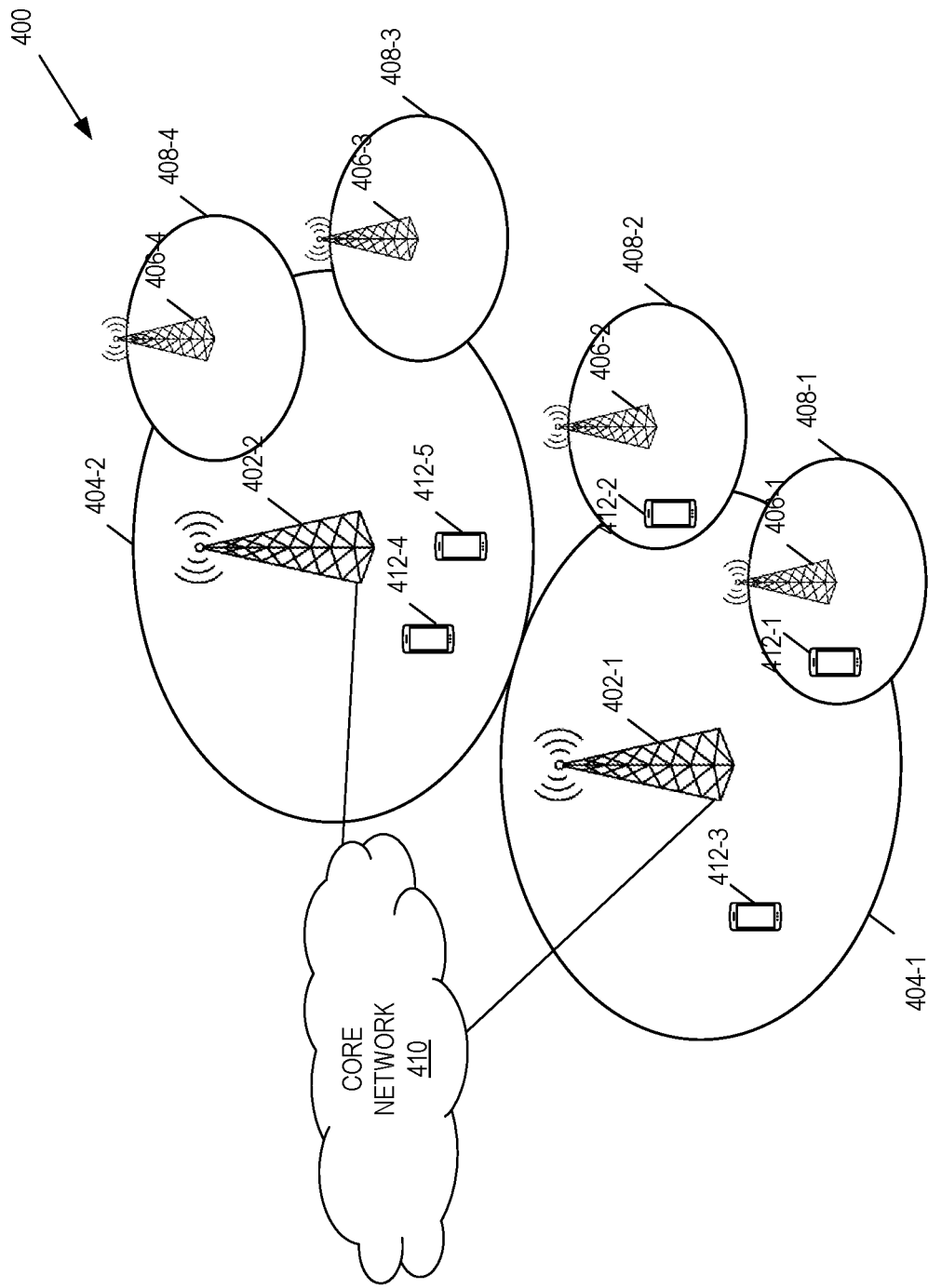
FIG. 4 illustrates one example of a cellular communications network in which embodiments of the present disclosure may be implemented.

Systems and methods for adapting report mapping based on beamforming are disclosed. In this regard, FIG. 4 illustrates one example of a cellular communications network 400 in which embodiments of the present disclosure may be implemented. In the embodiments described herein, the cellular communications network 400 is a Fifth Generation (5G) NR network. In this example, the cellular communications network 400 includes base stations 402-1 and 402-2, which in 5G NR are referred to as gNBs, controlling corresponding macro cells 404-1 and 404-2. The base stations 402-1 and 402-2 are generally referred to herein collectively as base stations 402 and individually as base station 402. Likewise, the macro cells 404-1 and 404-2 are generally referred to herein collectively as macro cells 404 and individually as macro cell 404. The cellular communications network 400 may also include a number of low power nodes 406-1 through 406-4 controlling corresponding small cells 408-1 through 408-4. The low power nodes 406-1 through 406-4 can be small base stations (such as pico or femto base stations) or RRHs, or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The base stations 402 (and optionally the low power nodes 406) are connected to a core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as UEs.

Figure 5:
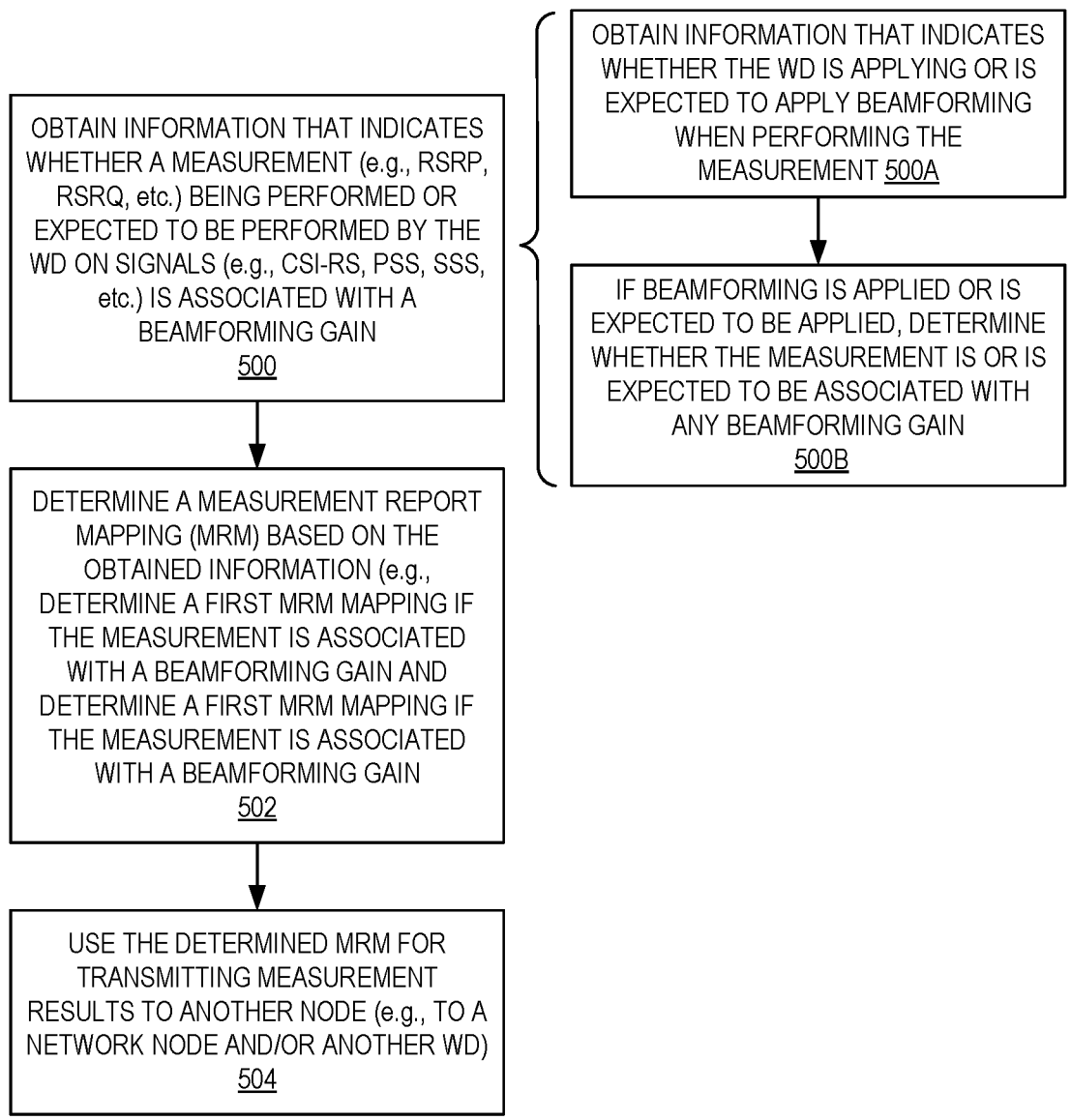
FIG. 5 is a flow chart that illustrates the operation of the wireless device in accordance with embodiments of the present disclosure.

FIG. 5 is a flow chart that illustrates the operation of the wireless device 412 (e.g., a UE) in accordance with embodiments of the present disclosure. As illustrated, the process, which is implemented in the wireless device 412 comprises:

Step 500: Obtaining information as to whether a measurement (e.g., RSRP, RSRQ, etc.) that is being performed by the wireless device 412 or is expected to be performed by the wireless device 412 on signals (e.g., Channel State Information Reference Signal (CSI-RS), Primary Synchronization Signal (PSS), Secondary Synchronization Signal (SSS), etc.) is associated with a beamforming gain or not;

Step 502: Determining a MRM based on the obtained information e.g.:
Determining a first MRM (MRM1) if the measurement is associated with the beamforming gain; and
Determining a second MRM (MRM2) if the measurement is not associated with the beamforming gain;

Step 504: Using the determined MRM (MRM1 or MRM2) for transmitting measurement results to another node, e.g. to a network node (e.g., the base station 402), another wireless device, etc.

The steps illustrated in FIG. 5 are described below in detail with several examples.

The wireless device 412 is configured to perform one or more radio measurements (e.g., RSRP, RSRQ, etc.) on signals of one or more cells. The configuration for performing the measurements can be done by a network node (e.g., network node managing or serving the serving cell of the wireless device 412), by another wireless device (e.g., if the wireless device 412 is D2D capable, etc.), autonomously by the wireless device 412, or the like.

The wireless device 412 is assumed to be capable of performing one or more measurements with and without beamforming. When applying beamforming, the wireless device 412 uses two or more antenna elements. The wireless device 412 may also use more than one antenna element when it does not perform beamforming. The beamforming may comprise receiver beamforming, transmitter beamforming, or both receiver and transmitter beamforming. For example, when the wireless device 412 applies the beamforming for performing the measurement, the obtained measurement result may include a certain beamforming gain. The actual value of the gain may depend on one or more factors or conditions, e.g. orientation of the wireless device 412, number of elements used for doing the measurement, antenna element design, operating environment, antenna gain, etc.

For performing measurements on received signals (e.g., RSRP, RSRQ, etc.), the receiver beamforming gain is applied. Examples of maximum receiver beamforming gain are 10 decibels (dB), 15 dB, etc. and the maximum receiver beamforming gain is a function of the wireless device design. Assume that the wireless device 412 uses the receiver beamforming for performing a measurement (e.g., RSRP) and the associated beamforming gain is Y1 dB. In this example, the wireless device 412 reported RSRP of Y2 dBm includes Y1 dB of beamforming gain and Y3 dBm is the value without any beamforming gain. As an example Y1, Y2, and Y3 are 10 dB, −50 dBm, and −60 dBm respectively and the definitions are such that Y2=Y1+Y3. For performing measurement on transmitted signals (e.g., wireless device transmit power, wireless device power headroom (e.g., difference between configured transmit power and estimated transmit power of the wireless device 412), etc.), the transmitter beamforming gain is applied by the wireless device 412, e.g. 5 dB or 10 dB transmitter beamforming gain applied to the estimated Power Headroom (PH).

In yet another example, no beamforming gain is obtained even if the wireless device 412 applies beamforming for performing certain types of measurements, e.g. SINR measured on SSS or Demodulation Reference Signal (DMRS). In this example (SINR measurement on SSS), the beamforming gains on the numerator (e.g., measured signal) and on the denominator (e.g., the interference parts) are equal and hence cancel out on the numerator and denominator of the ratio, resulting in no overall beamforming gain.

In step 500, the wireless device 412 obtains information that indicates whether the wireless device 412 is applying or is expected to apply beamforming when performing the measurement (step 500A). If beamforming is applied or expected to be applied, then the wireless device 412 further determines whether the performed measurement quantity is or is expected to be associated with any beamforming gain or not (step 500B). The wireless device 412 determines whether the measurement quantity is or is expected to be associated with any beamforming gain is based on one or more criteria or conditions. Examples of such criteria or conditions are:

Frequency range of signals used for measurements: For example, the wireless device 412 does not apply any beamforming for doing measurements on signals belonging to a first frequency range (FR1) while it applies beamforming for doing measurements on signals belonging to a second frequency range (FR2). As an example, FR1<FR2. In yet another example, FR1 contains frequencies which are equal to or below certain threshold, e.g. 6 GHz etc. In yet another example, FR2 contains frequencies which are above certain a threshold, e.g. 6 GHz, etc. In yet another example, FR2 contains frequencies which belong to mmW, e.g. 24 GHz or above, etc. This means no beamforming gain is expected in the measurement performed on signals belonging to FR1. On the other hand, certain beamforming gain (e.g., up to 10 dB) is expected in the measurement performed on signals belonging to FR2. In yet another example, different levels of beamforming gain may be associated with measurements done on frequencies belonging to different frequency ranges. For example, the maximum beamforming gain can be Z1 dB for measurements done on signals belonging to FR2. But the maximum beamforming gain can be Z2 dB for measurements done on signals belonging in a third frequency range (FR3) where FR2<FR3 and Z1<Z2. An example of FR1 comprises frequencies between 6 and 52.6 GHz, whereas FR3 comprises frequencies between 52.6 GHz and 90 GHz. The embodiments are applicable to any number of frequency ranges.

Type of signals used for performing the measurements: For example, if the measurement quantity is a ratio and numerator and denominator parts of a measurement quality (e.g., signal quality measurement such as RSRQ, SINR, etc.) are performed by the wireless device 412 on different types of signals, then the wireless device 412 assumes that the overall measurement results will be associated with beamforming gain. For example, RSRQ=RSRP/RSSI (in linear units). So, if the energy in both were coming from the same direction, the beamforming gain would be the same for both RSRP and RSSI and hence the range of RSRQ is unaffected by beamforming gain. On the other hand, if the wireless device 412 beamforms towards the measured cell and RSSI is mainly interference from other directions, then beamforming makes RSRQ larger. Thus, if the overall measurement quantity is a ratio of numerator and denominator signal quality measurements (e.g., RSRQ (=RSRP/RSSI) or SINR (=RSRP/(RSSI-RSRP)) performed by the wireless device 412 on different types of signals, then the wireless device 412 assumes that the overall measurement results will be associated with beamforming gain. On the other hand, when at least part of the numerator and denominator of the measurement quality (e.g., signal quality measurement such as RSRQ, SINR, etc.) are performed by the wireless device 412 on the same signals (or signals received from the same direction), then the wireless device 412 assumes that the overall measurement results will not be associated with any beamforming gain. Examples of numerator and denominator are RSRP and RSSI respectively in RSRQ. For example, if RSRP is performed on SSS while RSSI is performed on signals other than SSS (e.g., in signals of a physical channel such as Physical Downlink Shared Channel (PDSCH), Physical Downlink Control Channel (PDCCH), Physical Uplink Shared Channel (PUSCH), Physical Uplink Control Channel (PUCCH), etc.), then the overall measurement quality (e.g., Synchronization Signal (SS) RSRQ) will include beamforming gain. But if RSRP is performed on SSS and also RSSI is performed on at least SSS, then the overall measurement quality (e.g., SS-RSRQ) will not include any beamforming gain. The wireless device 412 can be configured to performed RSSI within RSRQ in certain symbols, e.g. in symbols containing only data and/or control channel, etc. For example, if the wireless device 412 is configured to measure the RSSI part of RSRQ within the first N symbols within a slot containing SS Block (SSB) configured for RSRQ measurement, then the measurement may include beamforming gain provided N≤Nt, e.g. Nt=2. But if Nt>2, then the measurement does not include any beamforming gain. This is because, as an example, the first two symbols in the slot do not contain any reference signal used for RSRP measurement. These symbols may instead contain one or more physical channels. A physical channel contains higher layer information, e.g. data and/or control information. On the other hand, reference signal is an example of a physical signal that does not contain any higher layer information. The wireless device 412 can be configured to performed RSSI within RSRQ in certain symbols based on a predefined rule and/or based on a configuration message (e.g., measurement configuration) received from another node, e.g. from a network node.

UE capability for using beamforming for measurements: The use of beamforming for measurements involves more wireless device processing, complexity, and power consumption. Therefore, every wireless device may not have the capability to apply beamforming for doing radio measurements. Certain wireless devices may have the capability to apply receiver beamforming and/or transmitter beamforming for doing radio measurements. This is particularly feasible for a wireless device which performs hybrid or digital beamforming. If the wireless device 412 is capable of doing beamforming when performing the measurements, then the wireless device 412 assumes that the measurement quantity will include beamforming gain.

UE power consumption and processing: In order to conserve wireless device battery and/or reduce wireless device processing, the wireless device 412 may decide not to apply beamforming for doing radio measurements even if the wireless device 412 is capable of beamforming. For example, if the wireless device battery power is below a certain threshold (e.g., below 25% of maximum value), then the wireless device 412 may decide not to apply the beamforming for doing radio measurements; in this case no beamforming gain will be included in the measurement value.

Configuration message received from another node: For example, the network node or another wireless device (e.g., in D2D communication mode) may configure the wireless device 412 as to whether or not to apply the beamforming when performing the measurement. The network node may further configure the wireless device 412 with a MRM (e.g., MRM1) which is associated with beamforming gain if the UE is required to apply the beamforming when performing the measurement.

Otherwise, the network node may configure the wireless device 412 with a MRM (e.g., MRM2) which is not associated with beamforming gain if the wireless device 412 is not required to apply any beamforming when performing the measurement.

In step 502, the wireless device 412 determines a MRM to use based on the obtained information and, in particular, based on whether there is an association between the measurement and a beamforming gain. If the wireless device 412 obtains information that the measurement is or will be associated with the beamforming gain, then the wireless device 412 determines a first MRM (MRM1). MRM1 is related to or involves the beamforming gain. Therefore, MRM1 enables the UE to transmit the measurement results to another node that reflect or include certain beamforming gain.

If the wireless device 412 obtains information that the measurement is not or will not be associated with any beamforming gain, then the wireless device 412 determines a second MRM (MRM2). The measurement results reported using MRM2 do not include any beamforming gain. In some embodiments, MRM1 and MRM2 are predefined. In some other embodiments, MRM2 and MRM2 are configured at the wireless device 412 by a node, e.g. by a network node such as by the serving cell.

As an example, MRM1 and MRM2 for the same measurement quantity (e.g., RSRP) differ in that the maximum reportable value in MRM1 is larger than the maximum reportable value in MRM2. In yet another example, MRM1 and MRM2 for the same measurement quantity (e.g., RSRP) differ in that the minimum reportable value in MRM1 is larger than the minimum reportable value in MRM2. In other words, in MRM1 the upper reporting range is increased by 10 dB. These two differences between MRM1 and MRM2 are shown in Tables 1 and 2, respectively (in examples 1 and 2 with and without beamforming gain, respectively). In these examples the maximum values differ by 10 dB due to beamforming gain in MRM1 and also the minimum values differ by 10 dB due to beamforming gain in MRM1. In yet another example, MRM1 and MRM2 for the same measurement quantity (e.g., RSRP) differ in that the maximum reportable value in MRM1 is larger than the maximum reportable value in MRM2, while the minimum reportable values are the same in both cases. This is shown in examples in Table 1 (with beamforming gain) and in Table 3 (without beamforming gain). In yet another example, the reported resolution may differ between MRM1 and MRM2. For example, in case of MRM2 the reported resolution may be smaller compared to that in MRM1, e.g. 1 dB in MRM1 and 0.5 dB in MRM2. In these examples in Tables 1, 2, and 3, the RSRP can be for example SS-RSRP or CSI-RSRP. These examples are also applicable for other signal strength measurements, e.g. path loss, etc.

TABLE 1

MRM1; RSRP measurement report mapping with beamforming gain (Example 1)

| Reported value | Measured quantity value | Unit |
|---|---|---|
| RSRP_000 | RSRP < −156 | dBm |
| RSRP_001 | −156 ≤ RSRP < −155 | dBm |
| ... | ... | ... |
| RSRP_126 | −35 ≤ RSRP < −34 | dBm |
| RSRP_127 | −34 ≤ RSRP | dBm |

TABLE 2

MRM2; RSRP measurement report mapping without beamforming gain (Example 2)

| Reported value | Measured quantity value | Unit |
|---|---|---|
| RSRP_000 | RSRP < −166 | dBm |
| RSRP_001 | −166 ≤ RSRP < −165 | dBm |
| ... | ... | ... |
| RSRP_126 | −45 ≤ RSRP < −44 | dBm |
| RSRP_127 | −44 ≤ RSRP | dBm |

TABLE 3

MRM2; RSRP measurement report mapping without beamforming gain (Example 3)

| Reported value | Measured quantity value | Unit |
|---|---|---|
| RSRP_000 | RSRP < −156 | dBm |
| RSRP_001 | −156 ≤ RSRP < −155 | dBm |
| ... | ... | ... |
| RSRP_126 | −45 ≤ RSRP < −44 | dBm |
| RSRP_127 | −44 ≤ RSRP | dBm |

Another set of examples of MRM1 and MRM2 for the same measurement quantity (e.g., RSRQ) are shown in Tables 4, 5, and 6. In Table 4, the measurement results can include beamforming gain. In Tables 5 and 6, the measurement results do not include any beamforming gain. For example, due to the possible beamforming gain in Table 4, the maximum reportable RSRQ value is 34 dB. This is 31.5 dB higher compared to the maximum reportable RSRQ values of 2.5 dB in Tables 5 and 6. In yet another example, the reported resolution of RSRQ may differ between MRM1 and MRM2. For example, in case of MRM2 the reported resolution of RSRQ may be smaller compared to that in MRM2, e.g. 0.5 dB in MRM1 and 0.25 dB in MRM2. The wireless device 412 may also use MRM1 in Table 4 (or any table with beamforming) for reporting the results if the NR carrier RSSI is measured on symbols which do not contain any reference signals (e.g., SSS, DMRS, CSI-RS, etc.) used for RSRP measurement within RSRQ. But if NR carrier RSSI is measured in symbols which also contain reference signals used for RSRP, then the wireless device 412 uses MRM2 (e.g., in Table 5 or Table 6) for reporting the results. The wireless device 412 can be configured by higher layers (e.g., via RRC message) with the symbols in which the wireless device 412 is required to perform NR carrier RSSI measurement. If these configured symbols for RSSI measurement do not contain any reference signals used for RSRP, then the wireless device 412 uses MRM1 for reporting the measurement results to the network node. In these examples in Tables 4, 5, and 6, the RSRQ can be for example SS-RSRQ or CSI-RSRQ. These examples are also applicable for other signal quality measurements, e.g. SINR, etc.

TABLE 4

MRM1; RSRQ measurement report mapping with beamforming gain (Example 4)

| Reported value | Measured quantity value | Unit |
|---|---|---|
| RSRQ_000 | RSRQ < −34 | dB |
| RSRQ_001 | −34 ≤ RSRQ < −33.5 | dB |
| ... | ... | ... |
| RSRQ_126 | +28.5 ≤ RSRQ < +29 | dB |
| RSRQ_127 | +29 ≤ RSRQ | dB |

TABLE 5

MRM2; RSRQ measurement report mapping
without beamforming gain (Example 5)

| Reported value | Measured quantity value | Unit |
|---|---|---|
| RSRQ_000 | RSRQ < −44 | dB |
| RSRQ_001 | −44 ≤ RSRQ < −43.5 | dB |
| ... | ... | ... |
| RSRQ_126 | +2 ≤ RSRQ < +2.5 | dB |
| RSRQ_127 | +2.5 ≤ RSRQ | dB |

TABLE 6

MRM2; RSRQ measurement report mapping
without beamforming gain (Example 6)

| Reported value | Measured quantity value | Unit |
|---|---|---|
| RSRQ_000 | RSRQ < −34 | dB |
| RSRQ_001 | −34 ≤ RSRQ < −33.5 | dB |
| ... | ... | ... |
| RSRQ_126 | +2 ≤ RSRQ < +2.5 | dB |
| RSRQ_127 | +2.5 ≤ RSRQ | dB |

Another set of examples of MRM with beamforming where the beamforming gain depends on different frequency ranges of the measured signals are expressed in Tables 7, 8, and 9. For example, MRM11 and MRM12 or MRM13 are examples for reporting results associated with beamforming in FR2 and FR3 respectively. In Table 7, the maximum beamforming gain for RSRP measured on signals belonging to FR2 is 10 dB. In Table 8, the maximum beamforming gain for RSRP measured on signals belonging to FR3 is 30 dB. In Table 8, the number of reportable values are also increased by 20 since only the upper reporting range is increased by 20 dB; this requires one additional bit. In Table 9, the maximum beamforming gain for RSRP measured on signals belonging to FR3 is also 20 dB while the minimum value is also increased by 20 dB. Therefore in this case the total reportable values are the same as in Table 7 (i.e., 128 reportable values requiring seven bits).

TABLE 7

MRM11; RSRP measurement report mapping with
beamforming gain for FR2 (Example 7)

| Reported value | Measured quantity value | Unit |
|---|---|---|
| RSRP_000 | RSRP < −156 | dBm |
| RSRP_001 | −156 ≤ RSRP < −155 | dBm |
| ... | ... | ... |
| RSRP_126 | −35 ≤ RSRP < −34 | dBm |
| RSRP_127 | −34 ≤ RSRP | dBm |

TABLE 8

MRM12; RSRP measurement report mapping with
beamforming gain for FR3 (Example 8)

| Reported value | Measured quantity value | Unit |
|---|---|---|
| RSRP_000 | RSRP < −156 | dBm |
| RSRP_001 | −156 ≤ RSRP < −155 | dBm |
| ... | ... | ... |
| RSRP_146 | −15 ≤ RSRP < −14 | dBm |
| RSRP_147 | −14 ≤ RSRP | dBm |

TABLE 9

MRM13; RSRP measurement report mapping with
beamforming gain for FR3 (Example 9)

| Reported value | Measured quantity value | Unit |
|---|---|---|
| RSRP_000 | RSRP < −136 | dBm |
| RSRP_001 | −136 ≤ RSRP < −135 | dBm |
| ... | ... | ... |
| RSRP_126 | −15 ≤ RSRP < −14 | dBm |
| RSRP_127 | −14 ≤ RSRP | dBm |

Figure 5A:
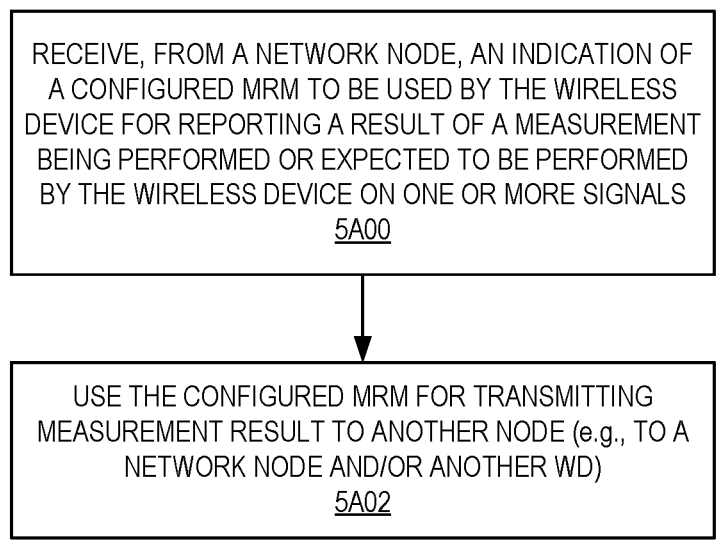
FIG. 5A is a flow chart that illustrates the operation of the wireless device in accordance with some other embodiments of the present disclosure.

Rather than autonomously determining the MRM to use, in some other embodiments, the wireless device 412 receives a configuration from a network node (e.g., base station 402) that indicates which MRM is to be used by the wireless device 412, as described below with respect to the discussion of the operation of a network node. In this regard, FIG. 5A is a flow chart that illustrates the operation of the wireless device 412 in accordance with this embodiment of the present disclosure. As illustrated, the wireless device 412 receives, from a network node (e.g., the base station 402), an indication of a configured MRM to be used by the wireless device 412 for reporting a result of a measurement being performed or expected to be performed by the wireless device 412 on one or more signals (step 5A00). As described herein, the MRM that the wireless device 412 is configured to use is one of a set of two or more possible MRMs for reporting a result of the measurement (e.g., one of a set of two or more possible MRMs for the same measurement type). The wireless device 412 then uses the configured MRM to transmit a measurement result (i.e., a result of the measurement) to another node (e.g., to another wireless device or to the network node) (step 5A02).

Figure 6:
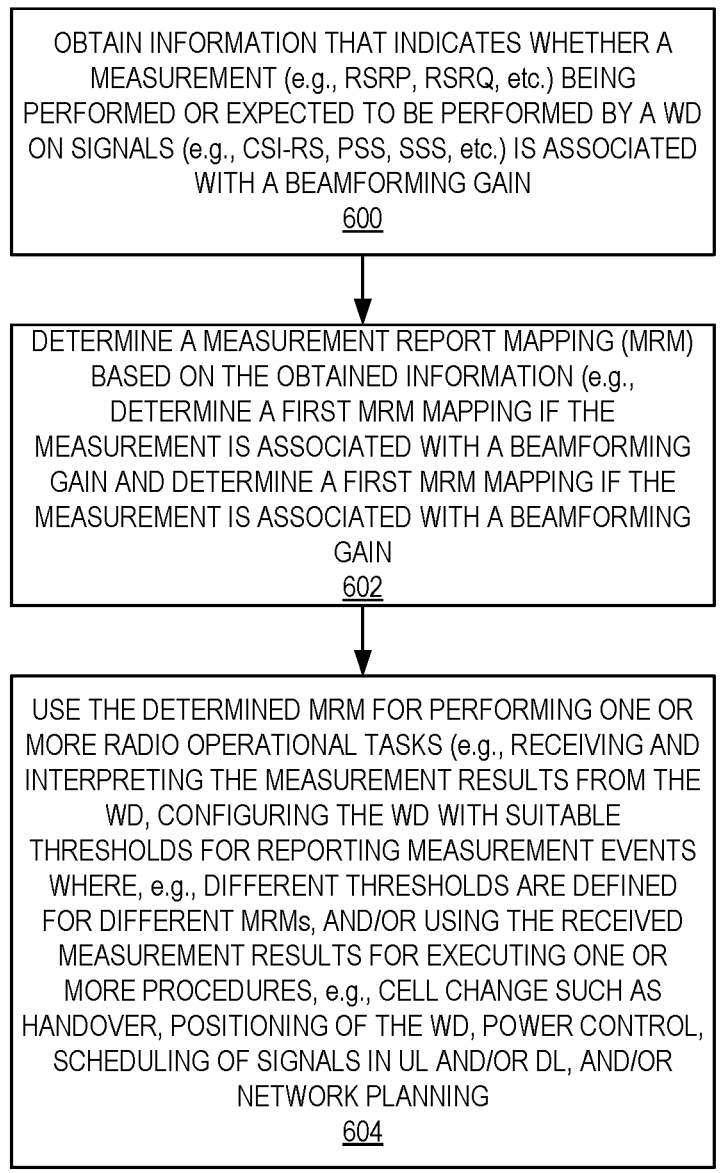
FIG. 6 illustrates the operation of a network node (e.g., a base station) in accordance with some embodiments of the present disclosure.

FIG. 6 illustrates the operation of a network node (e.g., a base station 402) in accordance with some other embodiments of the present disclosure. In this example, the process comprises:

Step 600: Obtaining information as to whether a measurement (e.g., RSRP, RSRQ, etc.) that is being performed by the wireless device 412 or is expected to be performed by the wireless device 412 on signals (e.g. CSI-RS, PSS, SSS, etc.) is associated with a beamforming gain or not;

Step 602: Determining a MRM based on the obtained information, e.g.:

Determining a first MRM (MRM1) if the measurement is associated with the beamforming gain; and Determining a second MRM (MRM2) if the measurement is not associated with the beamforming gain;

Step 604: Using the determined MRM (MRM1 or MRM2) for performing one or more radio operational tasks or actions. Examples of such tasks are:

Receiving and interpreting the measurement results from the wireless device 412;

Configuring the wireless device 412 with a suitable MRM, e.g. MRM1 or MRM2;

Configuring the wireless device 412 with suitable thresholds for reporting measurement events, with the thresholds being defined using, e.g. mapping MRM1 or MRM2;

Using the received results for executing one or more procedures, e.g. cell change such as HO, positioning of the wireless device 412, power control, scheduling of signals in uplink and/or in downlink, network planning, etc.

These steps are described below in more detail along with some examples.

The network node configures the wireless device 412 to perform one or more radio measurements on signals of one or more cells. The network node further configures the wireless device 412 to report the results of the measurements to the network node or to another wireless device. The network node receives the results of the measurements from the wireless device 412 using one of a plurality of MRMs, e.g. MRM1, MRM2, etc. as described in the second embodiment.

According to one aspect of this embodiment the network node determines one of the plurality of MRMs that should be used by the wireless device 412 for reporting the measurement results. In this case the network node configures the wireless device 412 with the determined or selected MRM. For example, as described in the first embodiment:
- if the measurement being performed or expected to be performed by the wireless device 412 is expected to include a beamforming gain then the network node selects MRM1; or
- if the measurement being performed or expected to be performed by the wireless device 412 is not expected to include a beamforming gain then the network node selects MRM2.

The network node uses the same criteria or conditions as described above with respect to FIG. 5 for determining the MRM which should be used by the wireless device 412 for reporting the results. Therefore, examples described above are also applicable in this aspect of this embodiment.

According to some embodiments, the wireless device 412 autonomously selects or determines the MRM for reporting the measurement results to the network node as described above with respect to FIG. 5. In this case, the network node receives the results and uses one or more criteria or conditions as described in the first embodiment for determining the actual MRM (e.g., MRM1, MRM2, or MRM3, etc.) used by the wireless device 412 for transmitting the measurement results. The network node also uses the same criteria or conditions as described above for determining the MRM which has been used by the wireless device 412 for reporting the results. Therefore, examples described above are also applicable in this aspect of this embodiment. After determining the actual MRM used by the wireless device 412, the network node interprets the measurement results (e.g., measurement quantity). The network node uses the interpreted results for one or more operations, e.g. event threshold configuration, cell change, positioning, scheduling, power control, etc.

According to some embodiments, the wireless device 412 autonomously selects or determines the MRM for reporting the measurement results to the network node as described in the first embodiment, and indicates to the network node the selected MRM. Using the MRM indicated by the wireless device 412, the network node uses the interpreted results for one or more operations, e.g. event threshold configuration, cell change, positioning, scheduling, power control, etc.

Figure 7:
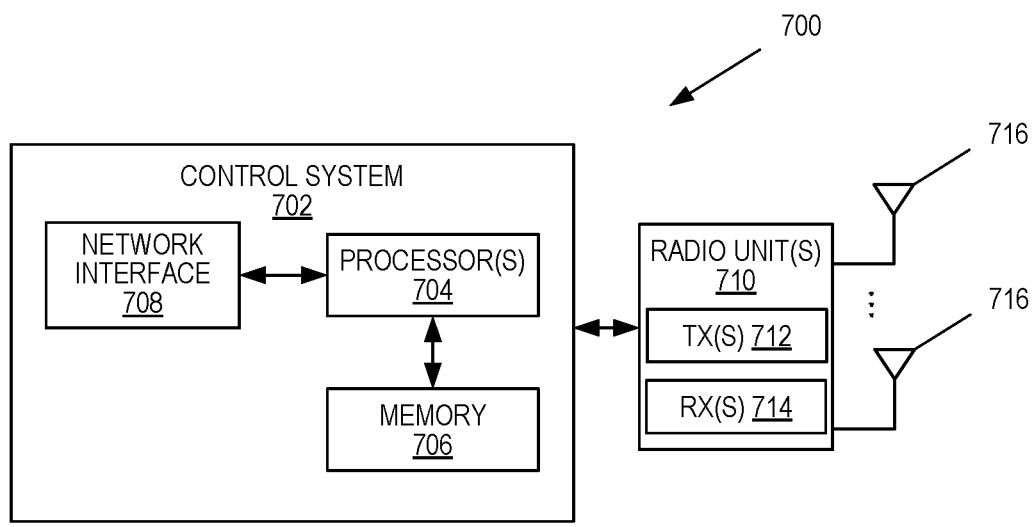
FIG. 7 is a schematic block diagram of a radio access node according to some embodiments of the present disclosure.

FIG. 7 is a schematic block diagram of a radio access node 700 according to some embodiments of the present disclosure. The radio access node 700 may be, for example, a base station 402 or 406. As illustrated, the radio access node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. In addition, the radio access node 700 includes one or more radio units 710 that each includes one or more transmitters 712 and one or more receivers 714 coupled to one or more antennas 716. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a radio access node 700 as described herein. In some embodiments, the function(s) are implemented in software that is stored, e.g., in the memory 706 and executed by the one or more processors 704.

Figure 8:
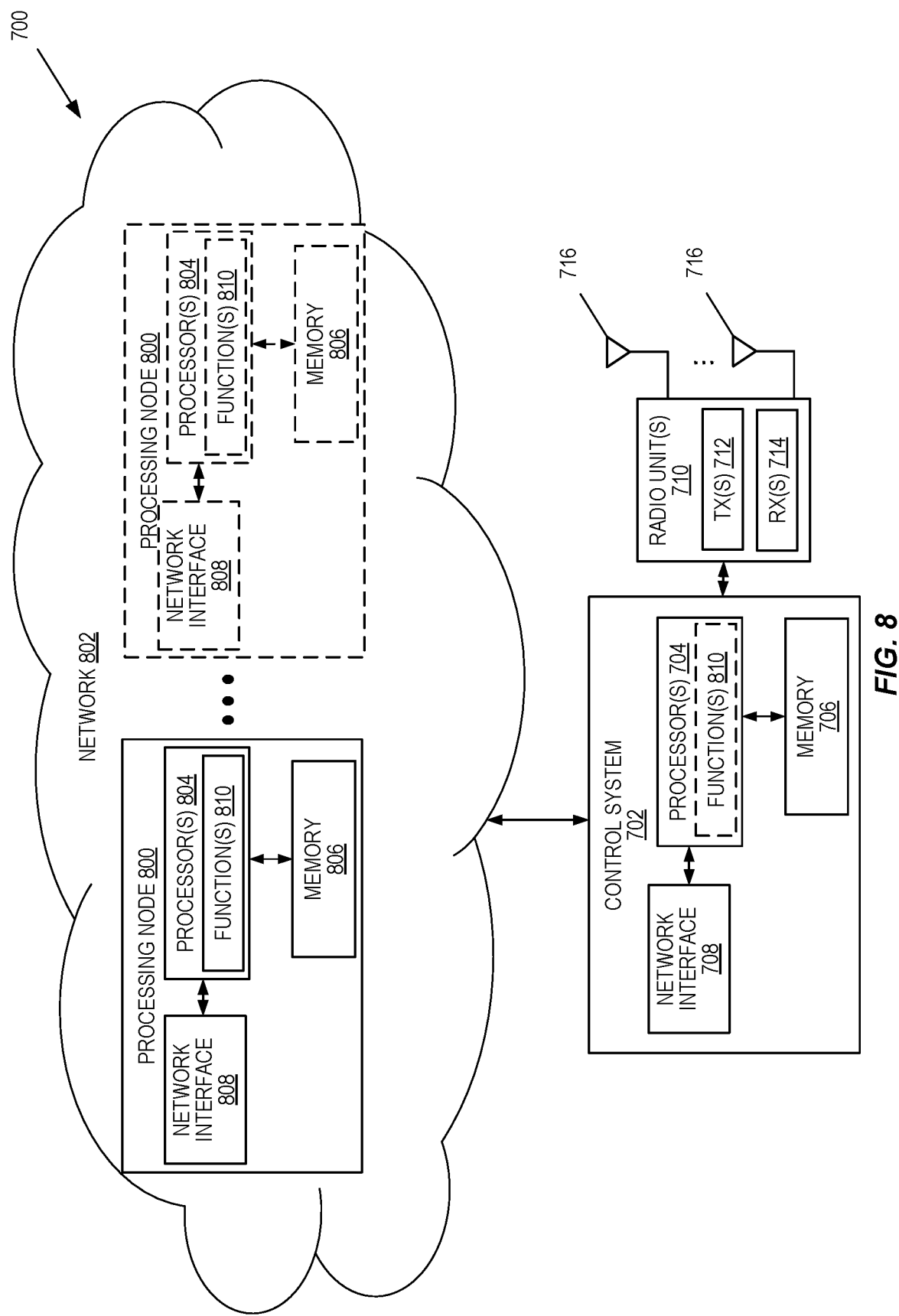
FIG. 8 is a schematic block diagram that illustrates a virtualized embodiment of the radio access node of FIG. 7 according to some embodiments of the present disclosure.

FIG. 8 is a schematic block diagram that illustrates a virtualized embodiment of the radio access node 700 according to some embodiments of the present disclosure. This discussion is equally applicable to other types of network nodes. Further, other types of network nodes may have similar virtualized architectures.

As used herein, a "virtualized" radio access node is an implementation of the radio access node 700 in which at least a portion of the functionality of the radio access node 700 is implemented as a virtual component(s) (e.g., via a virtual machine(s) executing on a physical processing node(s) in a network(s)). As illustrated, in this example, the radio access node 700 includes the control system 702 that includes the one or more processors 704 (e.g., CPUs, ASICs, FPGAs, and/or the like), the memory 706, and the network interface 708 and the one or more radio units 710 that each includes the one or more transmitters 712 and the one or more receivers 714 coupled to the one or more antennas 716, as described above. The control system 702 is connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the radio access node 700 described herein are implemented at the one or more processing nodes 800 or distributed across the control system 702 and the one or more processing nodes 800 in any desired manner. In some particular embodiments, some or all of the functions 810 of the radio access node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of radio access node 700 or a node (e.g., a processing node 800) implementing one or more of the functions 810 of the radio access node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
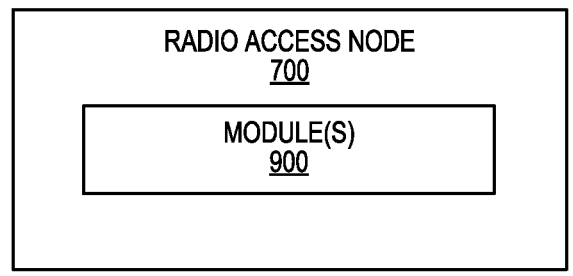
FIG. 9 is a schematic block diagram of the radio access node of FIG. 7 according to some other embodiments of the present disclosure.

FIG. 9 is a schematic block diagram of the radio access node 700 according to some other embodiments of the present disclosure. The radio access node 700 includes one or more modules 900, each of which is implemented in software. The module(s) 900 provide the functionality of the radio access node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
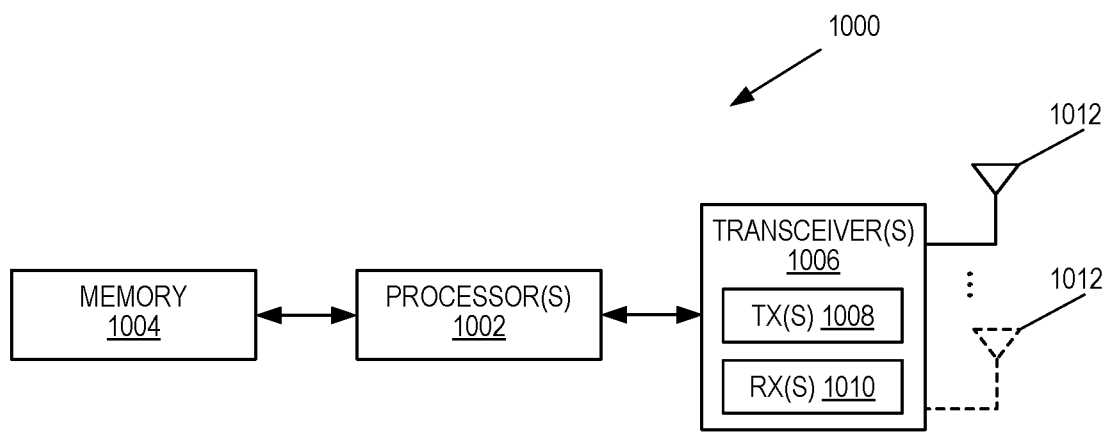
FIG. 10 is a schematic block diagram of a UE according to some embodiments of the present disclosure.

FIG. 10 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. In some embodiments, the functionality of the UE 1000 described above may be fully or partially implemented in software that is, e.g., stored in the memory 1004 and executed by the processor(s) 1002.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
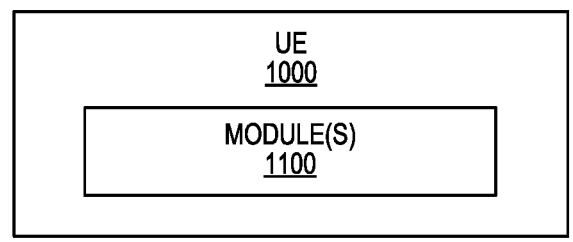
FIG. 11 is a schematic block diagram of the UE of FIG. 10 according to some other embodiments of the present disclosure.

FIG. 11 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 12:
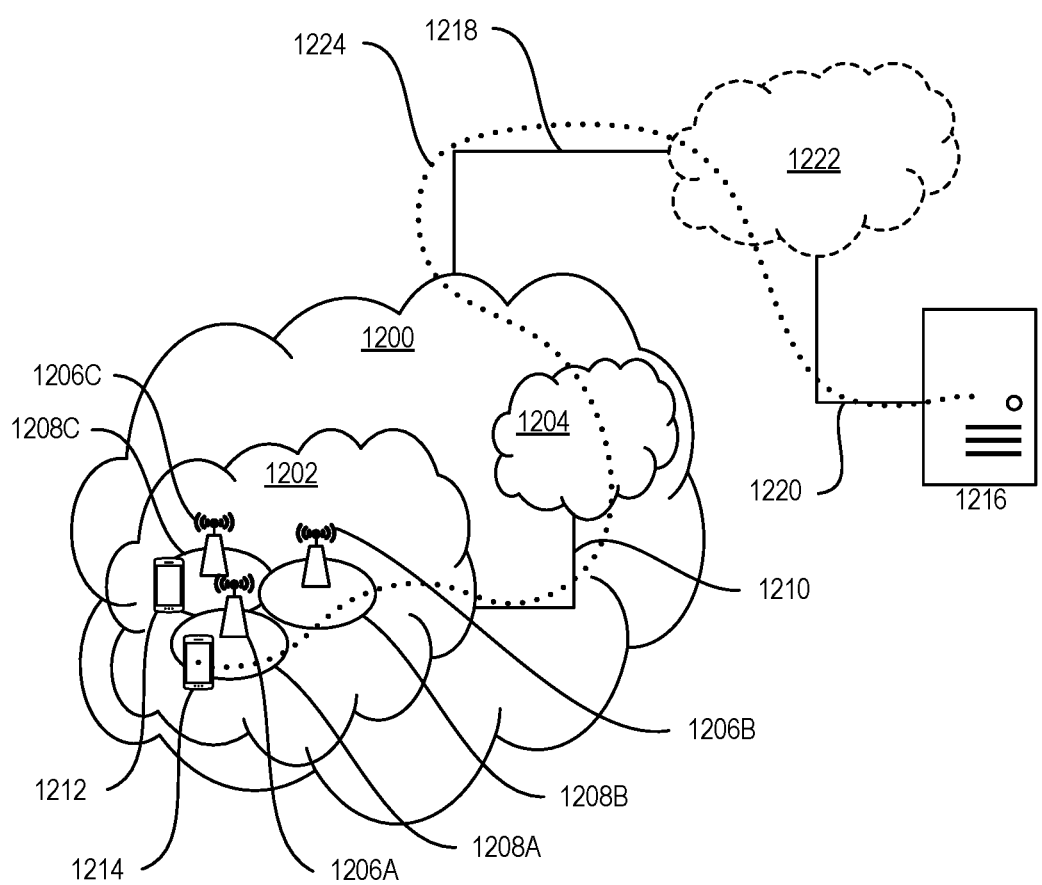
FIG. 12 illustrates a telecommunication network connected via an intermediate network to a host computer in accordance with some embodiments of the present disclosure.

With reference to FIG. 12, in accordance with an embodiment, a communication system includes a telecommunication network 1200, such as a 3GPP-type cellular network, which comprises an access network 1202, such as a Radio Access Network (RAN), and a core network 1204. The access network 1202 comprises a plurality of base stations 1206A, 1206B, 1206C, such as Node Bs, eNBs, gNBs, or other types of wireless APs, each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider, or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 12 as a whole enables connectivity between the connected UEs 1212, 1214 and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Example implementations, in accordance with an embodiment, of the UE, base station, and host computer discussed in the preceding paragraphs will now be described with reference to FIG. 13. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

Figure 13:
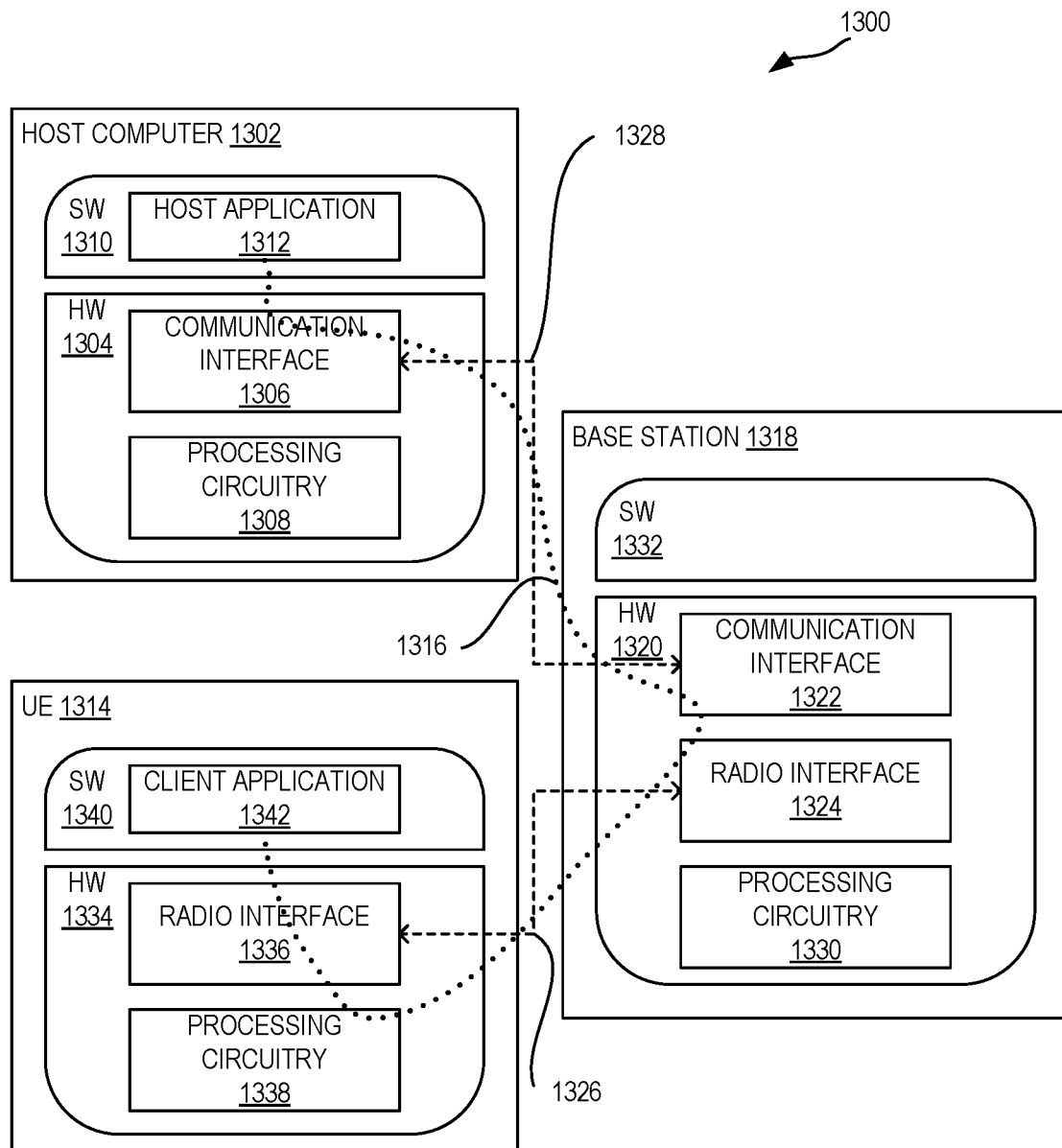
FIG. 13 is a generalized block diagram of a host computer communicating via a base station with a UE over a partially wireless connection in accordance with some embodiments of the present disclosure.

It is noted that the host computer 1302, the base station 1318, and the UE 1314 illustrated in FIG. 13 may be similar or identical to the host computer 1216, one of the base stations 1206A, 1206B, 1206C, and one of the UEs 1212, 1214 of FIG. 12, respectively. This is to say, the inner workings of these entities may be as shown in FIG. 13 and independently, the surrounding network topology may be that of FIG. 12.

In FIG. 13, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may improve, e.g., data rate, latency, and/or power consumption and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1314, and it may be unknown or imperceptible to the base station 1314. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

Figures 14, 15:
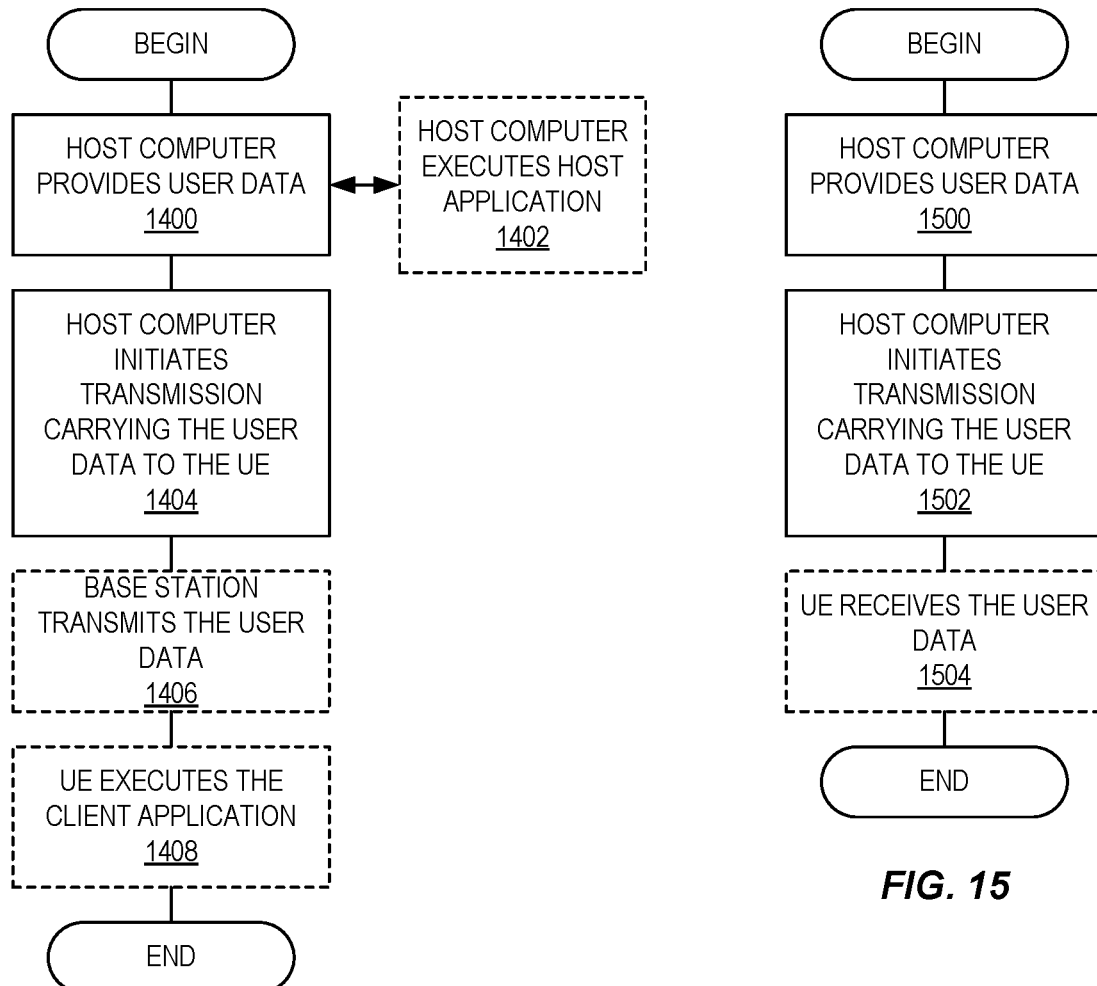
FIG. 14 is a flowchart illustrating a method implemented in a communication system in accordance with one embodiment of the present disclosure.
FIG. 15 is a flowchart illustrating a method implemented in a communication system in accordance with one embodiment of the present disclosure.

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1600 (which may be optional), the UE receives input data provided by the host computer. Additionally or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1700 (which may be optional), in accordance with the teachings of the embodiments described throughout this disclosure, the base station receives user data from the UE. In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments are as follows.

Group A Embodiments

Embodiment 1: A method performed by a wireless device (412) for adaptively determining and using measurement report mappings based on beamforming in a wireless communication system (400), the method comprising: obtaining (500) information indicative of whether a measurement being performed or expected to be performed by the wireless device (412) on one or more signals is associated with a beamforming gain; determining (502) a measurement report mapping based on the obtained information; and using (504) the determined measurement report mapping to transmit measurement results to another node.

Embodiment 2: The method of embodiment 1 wherein obtaining (500) the information indicative of whether the measurement being performed or expected to be performed by the wireless device (412) on one or more signals is associated with a beamforming gain comprises: obtaining (500A) information that indicates whether the wireless device (412) is applying or is expected to apply beamforming when performing the measurement; and, if the wireless device (412) is applying or is expected to apply beamforming when performing the measurement, determining (500B) whether the measurement is or is expected to be associated with any beamforming gain.

Embodiment 3: The method of embodiment 2 wherein determining (500B) whether the measurement is or is expected to be associated with any beamforming gain based on one or more criteria comprising: a criteria related to a frequency range of one or more signals used or to be used for the measurement; a criteria related to a type of signal(s) used or to be used for the measurement; a criteria related to a capability of the wireless device (412) to use beamforming for the measurement; a criteria related to power consumption and processing at the wireless device (412); and/or a criteria related to a configuration message received from another node.

Embodiment 4: The method of any one of embodiments 1 to 3 wherein determining (502) the measurement report mapping based on the obtained information comprises: determining the measurement report mapping as a first measurement report mapping if the measurement is associated with a beamforming gain; and determining the measurement report mapping as a second measurement report mapping if the measurement is not associated with a beamforming gain, the second measurement report mapping being different than the first measurement report mapping.

Embodiment 5: The method of embodiment 4 wherein the first measurement report mapping and the second measurement report mapping are for a same measurement quantity and differ in at least one of the following aspects: a maximum reportable value in the first measurement report mapping is greater than a maximum reportable value in the second measurement report mapping; a minimum reportable value in the first measurement report mapping is greater than a minimum reportable value in the second measurement report mapping; and/or a resolution of reportable values in the first measurement report mapping is different than a resolution of reportable values in the second measurement report mapping.

Embodiment 6: The method of any one of embodiments 1 to 3 wherein the determined measurement report mapping is one of two or more measurement report mappings comprising at least the first measurement report mapping and the second measurement report mapping, wherein the two or more measurement report mappings are for a same measurement quantity and differ with respect to at least one of a maximum reportable value, a minimum reportable value, and/or a resolution of reportable values.

Embodiment 7: The method of any one of embodiments 1 to 6 wherein the measurement is a signal quality measurement or a signal strength measurement.

Embodiment 8: The method of any of the previous embodiments, further comprising: providing user data; and forwarding the user data to a host computer via the transmission to a base station.

Group B Embodiments

Embodiment 9: A method performed by a network node for enabling adaptive determining and using of measurement report mappings based on beamforming in a wireless communication system (400), the method comprising: obtaining (600) information indicative of whether a measurement being performed or expected to be performed by a wireless device (412) on one or more signals is associated with a beamforming gain; determining (602) a measurement report mapping based on the obtained information; and using (604) the determined measurement report mapping for one or more operational tasks.

Embodiment 10: The method of embodiment 9 wherein the one or more operational tasks comprise: receiving and interpreting measurement results from the wireless device (412); configuring the wireless device (412) with suitable thresholds for reporting measurement events; and/or using measurement results received from the wireless device (412) for executing one or more procedures.

Embodiment 11: The method of embodiment 9 or 10 wherein obtaining (600) the information indicative of whether the measurement being performed or expected to be performed by the wireless device (412) on one or more signals is associated with a beamforming gain comprises: obtaining information that indicates whether the wireless device (412) is applying or is expected to apply beamforming when performing the measurement; and if the wireless device (412) is applying or is expected to apply beamforming when performing the measurement, determining whether the measurement is or is expected to be associated with any beamforming gain.

Embodiment 12: The method of embodiment 11 wherein determining whether the measurement is or is expected to be associated with any beamforming gain based on one or more criteria comprising: a criteria related to a frequency range of one or more signals used or to be used for the measurement; a criteria related to a type of signal(s) used or to be used for the measurement; a criteria related to a capability of the wireless device (412) to use beamforming for the measurement; a criteria related to power consumption and processing at the wireless device (412); and/or a criteria related to a configuration message received from another node.

Embodiment 13: The method of any one of embodiments 9 to 12 wherein determining (602) the measurement report mapping based on the obtained information comprises: determining the measurement report mapping as a first measurement report mapping if the measurement is associated with a beamforming gain; and determining the measurement report mapping as a second measurement report mapping if the measurement is not associated with a beamforming gain, the second measurement report mapping being different than the first measurement report mapping.

Embodiment 14: The method of embodiment 13 wherein the first measurement report mapping and the second measurement report mapping are for a same measurement quantity and differ at least one of the following aspects: a maximum reportable value in the first measurement report mapping is greater than a maximum reportable value in the second measurement report mapping; a minimum reportable value in the first measurement report mapping is greater than a minimum reportable value in the second measurement report mapping; and/or a resolution of reportable values in the first measurement report mapping is different than a resolution of reportable values in the second measurement report mapping.

Embodiment 15: The method of any one of embodiments 9 to 13 wherein the determined measurement report mapping is one of two or more measurement report mappings comprising at least the first measurement report mapping and the second measurement report mapping, wherein the two or more measurement report mappings are for a same measurement quantity and differ with respect to maximum reportable value, a minimum reportable value, and/or a resolution of reportable values.

Embodiment 16: The method of any one of embodiments 9 to 15 wherein the measurement is a signal quality measurement or a signal strength measurement.

Embodiment 17: The method of any one of embodiments 9 to 16 further comprising configuring the wireless device (412) to perform one or more radio measurements comprising the measurement and configuring the wireless device (412) to report measurement results for the one or more radio measurements.

Embodiment 18: The method of any one of embodiments 9 to 17 further comprising configuring the wireless device (412) with the determined measurement report mapping for the measurement.

Embodiment 19: The method of any of the previous embodiments, further comprising: obtaining user data; and forwarding the user data to a host computer or a wireless device.

Group C Embodiments

Embodiment 20: A wireless device for adaptively determining and using measurement report mappings based on beamforming in a wireless communication system, the wireless device comprising: processing circuitry configured to perform any of the steps of any of the Group A embodiments; and power supply circuitry configured to supply power to the wireless device.

Embodiment 21: A base station for enabling adaptive determining and using of measurement report mappings based on beamforming in a wireless communication system, the base station comprising: processing circuitry configured to perform any of the steps of any of the Group B embodiments; and power supply circuitry configured to supply power to the base station.

Embodiment 22: A User Equipment, UE, for adaptively determining and using measurement report mappings based on beamforming in a wireless communication system, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 23: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 24: The communication system of the pervious embodiment further including the base station.

Embodiment 25: The communication system of the previous 2 embodiments, further including the UE, wherein the UE is configured to communicate with the base station.

Embodiment 26: The communication system of the previous 3 embodiments, wherein: the processing circuitry of the host computer is configured to execute a host application, thereby providing the user data; and the UE comprises processing circuitry configured to execute a client application associated with the host application.

Embodiment 27: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 28: The method of the previous embodiment, further comprising, at the base station, transmitting the user data.

Embodiment 29: The method of the previous 2 embodiments, wherein the user data is provided at the host computer by executing a host application, the method further comprising, at the UE, executing a client application associated with the host application.

Embodiment 30: A User Equipment, UE, configured to communicate with a base station, the UE comprising a radio interface and processing circuitry configured to perform the method of the previous 3 embodiments.

Embodiment 31: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 32: The communication system of the previous embodiment, wherein the cellular network further includes a base station configured to communicate with the UE.

Embodiment 33: The communication system of the previous 2 embodiments, wherein: the processing circuitry of the host computer is configured to execute a host application, thereby providing the user data; and the UE's processing circuitry is configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 35: The method of the previous embodiment, further comprising at the UE, receiving the user data from the base station.

Embodiment 36: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 37: The communication system of the previous embodiment, further including the UE.

Embodiment 38: The communication system of the previous 2 embodiments, further including the base station, wherein the base station comprises a radio interface configured to communicate with the UE and a communication interface configured to forward to the host computer the user data carried by a transmission from the UE to the base station.

Embodiment 39: The communication system of the previous 3 embodiments, wherein: the processing circuitry of the host computer is configured to execute a host application; and the UE's processing circuitry is configured to execute a client application associated with the host application, thereby providing the user data.

Embodiment 40: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 41: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 42: The method of the previous embodiment, further comprising, at the UE, providing the user data to the base station.

Embodiment 43: The method of the previous 2 embodiments, further comprising: at the UE, executing a client application, thereby providing the user data to be transmitted; and at the host computer, executing a host application associated with the client application.

Embodiment 44: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 45: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 46: The communication system of the previous embodiment further including the base station.

Embodiment 47: The communication system of the previous 2 embodiments, further including the UE, wherein the UE is configured to communicate with the base station.

Embodiment 48: The communication system of the previous 3 embodiments, wherein: the processing circuitry of the host computer is configured to execute a host application; and the UE is configured to execute a client application associated with the host application, thereby providing the user data to be received by the host computer.

Embodiment 49: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 50: The method of the previous embodiment, further comprising at the base station, receiving the user data from the UE.

Embodiment 51: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
ADC Analog-to-Digital Converter
AP Access Point
ASIC Application Specific Integrated Circuit
CA Carrier Aggregation
CC Component Carrier
CPE Customer Premise Equipment
CPU Central Processing Unit
CSI-RS Channel State Information Reference Signal
D2D Device-to-Device
dB Decibel
dBm Decibel-Milliwatt
DMRS Demodulation Reference Signal
DSP Digital Signal Processor
eNB Enhanced or Evolved Node B
FPGA Field Programmable Gate Array
FR Frequency Range
GHz Gigahertz
gNB New Radio Base Station
HO Handover
LEE Laptop Embedded Equipment
LME Laptop Mounted Equipment
M2M Machine-to-Machine
MCE Multi-Cell/Multicast Coordination Entity
MDT Minimization of Drive Tests
MME Mobility Management Entity
mmW Millimeter Wave
MRM Measurement Report Mapping
MSR Multi-Standard Radio
NR New Radio
OTT Over-the-Top
PBCH Physical Broadcast Channel
PCC Primary Component Carrier
PCell Primary Cell
PDCCH Physical Downlink Control Channel
PDSCH Physical Downlink Shared Channel
PH Power Headroom
PSC Primary Serving Cell
PSS Primary Synchronization Signal
PUCCH Physical Uplink Control Channel
PUSCH Physical Uplink Shared Channel
RAM Random Access Memory
RAN Radio Access Network
RAT Radio Access Technology
RLM Radio Link Management
ROM Read Only Memory
RRC Radio Resource Control
RRH Remote Radio Head
RRU Remote Radio Unit
RSRP Reference Signal Received Power
RSRQ Reference Signal Received Quality
RSSI Received Signal Strength Indicator
RSTD Reference Signal Time Difference
RTT Round Trip Time
SCC Secondary Component Carrier
SCell Secondary Cell
SFN System Frame Number
SFTD System Frame Number Frame Time Difference
SI System Information
SINR Signal to Interference plus Noise Ratio
SNR Signal to Noise Ratio
SON Self-Organizing Network
SS Synchronization Signal
SSB Synchronization Signal Block
SSC Secondary Serving Cell
SSS Secondary Synchronization Signal
SSTD System Frame Number Subframe Time Difference
TOA Time of Arrival
UE User Equipment
USB Universal Serial Bus Those skilled in the art will recognize improvements and modifications to the embodiments of the present disclosure. All such improvements and modifications are considered within the scope of the concepts disclosed herein.

What is claimed is:

1. A method performed by a wireless device in a wireless communication system, the method comprising:
   obtaining information that indicates whether the wireless device is applying or is expected to apply beamforming when performing a measurement; and
   if the wireless device is applying or is expected to apply beamforming when performing the measurement, determining whether the measurement is or is expected to be associated with any beamforming gain based on a criteria related to a frequency range of one or more signals used or to be used for the measurement;
   determining a measurement report mapping based on the obtained information; and
   using the determined measurement report mapping to transmit a measurement result to another node.

2. The method of claim 1 wherein determining whether the measurement is or is expected to be associated with any of the beamforming gains further comprises determining whether the measurement is or is expected to be associated with the beamforming gain based on one or more criteria comprising:
   a criteria related to a type of signal(s) used or to be used for the measurement;
   a criteria related to a capability of the wireless device to use beamforming for the measurement;
   a criteria related to power consumption and processing at the wireless device; and/or
   a criteria related to a configuration message received from another node.

3. The method of claim 1 wherein determining the measurement report mapping based on the obtained information comprises:

determining the measurement report mapping as a first measurement report mapping if the measurement is associated with the beamforming gain; and determining the measurement report mapping as a second measurement report mapping if the measurement is not associated with the beamforming gain, the second measurement report mapping being different than the first measurement report mapping.

4. The method of claim 3 wherein the first measurement report mapping and the second measurement report mapping are for a same measurement quantity and differ with respect to:

a maximum reportable value in the first measurement report mapping is greater than a maximum reportable value in the second measurement report mapping;

a minimum reportable value in the first measurement report mapping is greater than a minimum reportable value in the second measurement report mapping; and/or a resolution of reportable values in the first measurement report mapping is different than a resolution of reportable values in the second measurement report mapping.

5. The method of claim 1 wherein the determined measurement report mapping is one of two or more measurement report mappings comprising at least a first measurement report mapping and a second measurement report mapping, wherein the two or more measurement report mappings are for a same measurement quantity and differ with respect to: a maximum reportable value, a minimum reportable value, and/or a resolution of reportable values.

6. The method of claim 1 wherein the determined measurement report mapping comprises a range of two or more reportable values for transmitting the result of the measurement to another node, and determining the measurement report mapping comprises selecting the measurement report mapping from a set of at least two measurement report mappings for a same measurement quantity that differ with respect to:

a maximum reportable value in the range of two or more reportable values;

a minimum reportable value in the range of two or more reportable values; and/or a resolution of reportable values in the range of two or more reportable values.

7. The method of claim 1 further comprising transmitting an indication of the determined measurement report mapping to the other node.

8. The method of claim 1 wherein the measurement is a signal quality measurement or a signal strength measurement.

9. A wireless device for a wireless communication system, the wireless device comprising:

one or more transmitters and one or more receivers; and processing circuitry associated with the one or more transmitters and the one or more receivers, the processing circuitry configured to cause the wireless device to:

obtain information that indicates whether the wireless device is applying or is expected to apply beamforming when performing a measurement; and if the wireless device is applying or is expected to apply beamforming when performing the measurement, determine whether the measurement is or is expected to be associated with any beamforming gain based on a criteria related to a frequency range of one or more signals used or to be used for the measurement;

determine a measurement report mapping based on the obtained information; and use the determined measurement report mapping to transmit a measurement result to another node.

10. The wireless device of claim 9 wherein the wireless device further determines whether the measurement is or is expected to be associated with any of the beamforming gains based on one or more criteria comprising:

a criteria related to a type of signal(s) used or to be used for the measurement;

a criteria related to a capability of the wireless device to use beamforming for the measurement;

a criteria related to power consumption and processing at the wireless device; and/or a criteria related to a configuration message received from another node.

11. The wireless device of claim 9 wherein the determined measurement report mapping comprises a range of two or more reportable values for transmitting the result of the measurement to another node, and:

in order to determine the measurement report mapping, the processing circuitry is further configured to cause the wireless device to select the measurement report mapping from a set of at least two measurement report mappings for a same measurement quantity that differ with respect to:

a maximum reportable value in the range of two or more reportable values;

a minimum reportable value in the range of two or more reportable values; and/or a resolution of reportable values in the range of two or more reportable values.

12. The wireless device of claim 9 wherein the processing circuitry is further configured to cause the wireless device to transmit an indication of the determined measurement report mapping to the other node.

13. The wireless device of claim 9 wherein the measurement is a signal quality measurement or a signal strength measurement.

14. A method performed by a wireless device in a wireless communication system, the method comprising:

receiving, from a network node, an indication of a configured measurement report mapping to be used by the wireless device for reporting a result of a measurement that is being performed or expected to be performed by the wireless device on one or more signals and is associated with a beamforming gain; and using the configured measurement report mapping to transmit the measurement result to another node;

where the configured measurement report mapping comprises a range of two or more reportable values for transmitting the result of the measurement to another node, and the configured measurement report mapping is one of a set of at least two measurement report mappings for a same measurement quantity that differ with respect to:

a maximum reportable value in the range of two or more reportable values;

a minimum reportable value in the range of two or more reportable values; and/or a resolution of reportable values in the range of two or more reportable values.

15. A wireless device for a wireless communication system, the wireless device comprising:

one or more transmitters and one or more receivers; and processing circuitry associated with the one or more transmitters and the one or more receivers, the processing circuitry configured to cause the wireless device to:

receive, from a network node, an indication of a configured measurement report mapping to be used by the wireless device for reporting a result of a measurement that is being performed or expected to be performed by the wireless device on one or more signals and is associated with a beamforming gain; and use the configured measurement report mapping to transmit the measurement result to another node;

where the configured measurement report mapping comprises a range of two or more reportable values for transmitting the result of the measurement to another node, and the configured measurement report mapping is one of a set of at least two measurement report mappings for a same measurement quantity that differ with respect to:

a maximum reportable value in the range of two or more reportable values;

a minimum reportable value in the range of two or more reportable values; and/or a resolution of reportable values in the range of two or more reportable values.

16. A method performed by a network node in a wireless communication system, the method comprising:

obtaining information that indicates whether the wireless device is applying or is expected to apply beamforming when performing the measurement;

if the wireless device is applying or is expected to apply beamforming when performing the measurement, determining whether the measurement is or is expected to be associated with any beamforming gain based on a criteria related to a frequency range of one or more signals used or to be used for the measurement;

determining a measurement report mapping based on the obtained information; and using the determined measurement report mapping for one or more operational tasks.

17. The method of claim 16 wherein the one or more operational tasks comprise:

receiving and interpreting measurement results from the wireless device;

configuring the wireless device with the measurement report mapping;

configuring the wireless device with suitable thresholds for reporting measurement events; and/or using measurement results received from the wireless device for executing one or more procedures.

18. The method of claim 17 wherein determining whether the measurement is or is expected to be associated with any of the beamforming gains further comprises determining whether the measurement is or is expected to be associated with any beamforming gain based on one or more criteria comprising:

a criteria related to a type of signal(s) used or to be used for the measurement;

a criteria related to a capability of the wireless device to use beamforming for the measurement;

a criteria related to power consumption and processing at the wireless device; and/or a criteria related to a configuration message received from another node.

19. The method of claim 16 wherein determining the measurement report mapping based on the obtained information comprises:

determining the measurement report mapping as a first measurement report mapping if the measurement is associated with any of the beamforming gains; and determining the measurement report mapping as a second measurement report mapping if the measurement is not associated with any of the beamforming gains, the second measurement report mapping being different than the first measurement report mapping.

20. The method of claim 19 wherein the first measurement report mapping and the second measurement report mapping are for a same measurement quantity and differ with respect to:

a maximum reportable value in the first measurement report mapping is greater than a maximum reportable value in the second measurement report mapping;

a minimum reportable value in the first measurement report mapping is greater than a minimum reportable value in the second measurement report mapping; and/or a resolution of reportable values in the first measurement report mapping is different than a resolution of reportable values in the second measurement report mapping.

21. The method of claim 16 wherein the determined measurement report mapping is one of two or more measurement report mappings comprising at least a first measurement report mapping and a second measurement report mapping, wherein the two or more measurement report mappings are for a same measurement quantity and differ with respect to maximum reportable value, a minimum reportable value, and/or a resolution of reportable values.

22. The method of claim 16 wherein the configured measurement report mapping comprises a range of two or more reportable values for transmitting a result of the measurement to another node, and the configured measurement report mapping is one of a set of at least two measurement report mappings for a same measurement quantity that differ with respect to:

a maximum reportable value in the range of two or more reportable values;

a minimum reportable value in the range of two or more reportable values; and/or a resolution of reportable values in the range of two or more reportable values.

23. The method of claim 16 wherein the measurement is a signal quality measurement or a signal strength measurement.

24. The method of claim 16 further comprising configuring the wireless device to perform one or more radio measurements comprising the measurement, and configuring the wireless device to report measurement results for the one or more radio measurements.

25. The method of claim 16 wherein the one or more operational tasks comprise configuring the wireless device with the determined measurement report mapping for the measurement.

26. A network node for a wireless communication system, the network node comprising:

a network interface or one or more radio units; and processing circuitry associated with the network interface or the one or more radio units, the processing circuitry configured to cause the network node to:

obtain information that indicates whether the wireless device is applying or is expected to apply beamforming when performing the measurement;

if the wireless device is applying or is expected to apply beamforming when performing the measurement, determine whether the measurement is or is expected to be associated with any beamforming gain based on a criteria related to a frequency range of one or more signals used or to be used for the measurement;

determine a measurement report mapping based on the obtained information; and use the determined measurement report mapping for one or more operational tasks.

27. The network node of claim 26 wherein the one or more operational tasks comprise:

receiving and interpreting measurement results from the wireless device;

configuring the wireless device with the measurement report mapping;

configuring the wireless device with suitable thresholds for reporting measurement events; and/or using measurement results received from the wireless device for executing one or more procedures.

28. The network node of claim 27 wherein the network node further determines whether the measurement is or is expected to be associated with any beamforming gain based on one or more criteria comprising:

a criteria related to a type of signal(s) used or to be used for the measurement;

a criteria related to a capability of the wireless device to use beamforming for the measurement;

a criteria related to power consumption and processing at the wireless device; and/or a criteria related to a configuration message received from another node.

29. The network node of claim 26 wherein the configured measurement report mapping comprises a range of two or more reportable values for transmitting a result of the measurement to another node, and the configured measurement report mapping is one of a set of at least two measurement report mappings for a same measurement quantity that differ with respect to:

a maximum reportable value in the range of two or more reportable values;

a minimum reportable value in the range of two or more reportable values; and/or a resolution of reportable values in the range of two or more reportable values.

* * * * *